United States Patent
Wang et al.

(10) Patent No.: US 10,454,640 B2
(45) Date of Patent: Oct. 22, 2019

(54) METHOD FOR REPORTING CHANNEL STATE INFORMATION, USER EQUIPMENT, AND BASE STATION

(71) Applicant: HUAWEI TECHNOLOGIES CO., LTD., Shenzhen, Guangdong (CN)

(72) Inventors: Jianguo Wang, Bonn (DE); Yongxing Zhou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 10 days.

(21) Appl. No.: 15/255,953

(22) Filed: Sep. 2, 2016

(65) Prior Publication Data

US 2016/0380734 A1 Dec. 29, 2016

Related U.S. Application Data

(63) Continuation of application No. PCT/CN2014/073007, filed on Mar. 6, 2014.

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS

2013/0182594 A1 7/2013 Kim et al.
2014/0192917 A1* 7/2014 Nam .................. H04B 7/0417
375/267

(Continued)

FOREIGN PATENT DOCUMENTS

CN 102291212 A 12/2011
CN 103326761 A 9/2013
(Continued)

OTHER PUBLICATIONS

Ying, Kronecker Product Correlation Model and Limited Feedback Codebook Design in a 3D Channel Model, Jan. 2014, all pages. (Year: 2014).*

(Continued)

*Primary Examiner* — Brandon M Renner
(74) *Attorney, Agent, or Firm* — Slater Matsil, LLP

(57) ABSTRACT

The present application discloses a method for reporting channel state information, user equipment, and a base station. The method includes: receiving a first reference signal set sent by a base station, where the first reference signal set includes at least two reference signals; sending first CSI to the base station, where the first CSI is determined according to the first reference signal set, and the first CSI includes a first RI and/or a first PMI, where the first PMI is used to indicate a first precoding matrix; receiving a second reference signal set sent by the base station, where the second reference signal set is determined based on the first CSI, and the second reference signal set includes at least one reference signal; and sending second CSI to the base station, where the second CSI is determined according to the second reference signal set.

17 Claims, 8 Drawing Sheets

(51) Int. Cl.
*H04B 7/06* (2006.01)
*H04B 17/309* (2015.01)
*H04B 17/382* (2015.01)

(52) U.S. Cl.
CPC .......... *H04L 5/0051* (2013.01); *H04L 5/0057* (2013.01); *H04B 17/309* (2015.01); *H04B 17/382* (2015.01); *H04L 5/0053* (2013.01); *H04L 5/0064* (2013.01)

(56) References Cited

U.S. PATENT DOCUMENTS

| | | | | |
|---|---|---|---|---|
| 2014/0241274 | A1* | 8/2014 | Lee | H04L 5/0048 370/329 |
| 2015/0092875 | A1* | 4/2015 | Kim | H04B 7/0478 375/267 |
| 2015/0146618 | A1 | 5/2015 | Ko et al. | |
| 2015/0288432 | A1* | 10/2015 | Kim | H04B 7/0413 370/329 |
| 2016/0043789 | A1 | 2/2016 | Wang et al. | |
| 2016/0065278 | A1 | 3/2016 | Wang et al. | |
| 2016/0065279 | A1 | 3/2016 | Wang et al. | |
| 2017/0005712 | A1* | 1/2017 | Jiang | H04B 7/0413 |

FOREIGN PATENT DOCUMENTS

| | | | |
|---|---|---|---|
| EP | 2 665 203 | A1 | 11/2013 |
| EP | 2 866 358 | A1 | 4/2015 |
| WO | WO 2010/147416 | A2 | 12/2010 |
| WO | 2014003384 | A1 | 1/2014 |
| WO | WO 2014/003384 | A1 | 1/2014 |

OTHER PUBLICATIONS

Extended European Search Report dated Feb. 16, 2017 in corresponding European Patent Application No. 14884341.0.
International Search Report dated Dec. 15, 2014 in corresponding International Patent Application No. PCT/CN2014/073007.
"3$^{rd}$ Generation Partnership Project; Technical Specification Group Radio Access Network; Evolved Universal Terrestrial Radio Access (E-UTRA); Multiplexing and channel coding (Release 12)", 3GPP TS 36.212 V12.0.0, 3$^{rd}$ Generation Partnership Project, Dec. 2013, Valbonne, France, pp. 1-88.
"Considerations on CSI feedback enhancements for high-priority antenna configurations", 3GPP TSG-RAN WG1 #66, R1-112420, 3$^{rd}$ Generation Partnership Project, Aug. 22-26, 2011, Athens, Greece, 7 pages.
"Way Forward on 8Tx Codebook for Rel.10 DL MIMO", 3GPP TSG RAN WG1 62, R1-105011, 3$^{rd}$ Generation Partnership Project, Aug. 23-27, 2010, Madrid, Spain, 6 pages.
"WF on antenna model in 3D channel modeling", 3GPP TSG RAN WG1 #72bis, R1-131761, 3$^{rd}$ Generation Partnership Project, Apr. 15-19, 2013, Chicago, IL, USA, 7 pages.
International Search Report, dated Dec. 15, 2014, in corresponding International Application No. PCT/CN2014/073007 (4 pp.).
Extended European Search Report dated Nov. 22, 2018 from European Patent Application No. 18169525.5, 10 pages.

* cited by examiner

METHOD FOR REPORTING CHANNEL STATE INFORMATION, USER EQUIPMENT, AND BASE STATION

CROSS-REFERENCE TO RELATED APPLICATIONS

This application is a continuation of International Application No. PCT/CN2014/073007, filed on Mar. 6, 2014, which is hereby incorporated by reference in its entirety.

TECHNICAL FIELD

The present application relates to the communications field, and in particular, to a method for reporting channel state information, user equipment, and a base station in the communications field.

BACKGROUND

A modern communications system widely uses multiple antennas to improve a system capacity and coverage, and improve user experience. For example, a Long Term Evolution (LTE) R8 system in the 3rd Generation Partnership Project (3GPP) can support four antenna ports, while an LTE R10 system can support eight antenna ports. By using a transmit beam forming (BF) or precoding technology and by using a receive signal combination technology, a multiple input multiple output (MIMO) system can obtain a diversity and array gains. A received signal in a system that uses the BF or precoding technology may be generally denoted by:

$y=Hvs+n$, where y denotes a vector of a received signal, H denotes a channel matrix, V denotes a precoding matrix, s denotes a transmit symbol vector, and n denotes measurement noise.

Precoding generally requires a transmitter to fully learn channel state information (CSI). A commonly used method is that user equipment quantizes instantaneous CSI and feeds back the instantaneous CSI to a base station. CSI information fed back by the existing LTE R8 system may include a rank indicator (RI), a precoding matrix indicator (PMI), a channel quality indicator (CQI), and the like. The RI and the PMI are used to indicate a serial number of a used layer and a used precoding matrix respectively. Generally, a set of used precoding matrixes is referred to as a codebook, and each precoding matrix in the set may be referred to as a codeword. A 4-antenna codebook in the existing LTE R8 system is designed based on a Householder transformation, and a dual-codebook design is further introduced into the LTE R10 system for the eight antennas. The foregoing two codebooks are primarily pertinent to an antenna design of a conventional base station, where the conventional base station controls an antenna beam direction in a vertical direction by using a fixed downtilt angle or a remote-electrical-tilt downtilt angle, and only a beam direction in a horizontal direction can be adjusted dynamically by means of precoding or beamforming.

To reduce system expenditure and accomplish a higher system capacity and meet a higher coverage requirement, an active antenna system (AAS) has been widely deployed in practice. In addition, an LTE R12 system that is currently launched and a future LTE R13 system are considering communication performance to be enhanced after an AAS system is introduced.

Different from the conventional base station, an AAS base station further provides freedom in designing the vertical direction of the antenna, which is primarily implemented by a two-directional antenna array in the horizontal and vertical directions of the base station. For the conventional base station, although each antenna port in the horizontal direction of the conventional base station can be obtained by weighted combination of multiple array elements in the vertical direction, the conventional base station actually uses only a horizontal one-dimensional array. For example, FIGS. 1-1A is a schematic diagram of a uniform linear array (ULA) antenna configuration of a conventional base station, FIGS. 1-1B is a schematic diagram of a cross polarization (XPO) antenna configuration of the conventional base station, FIGS. 1-2A is a schematic diagram of a uniform linear array antenna configuration of an AAS base station, and FIGS. 1-2B is a schematic diagram of a cross polarization antenna configuration of the AAS base station. In addition, for the AAS base station, more antenna ports may need to be considered. For example, the currently considered quantity of ports may be 8, 16, 32, or 64. Moreover, even with a same quantity of antenna ports, structures of the antenna arrays may differ. Therefore, a different channel state measurement result may be obtained for an antenna port of a same serial number in a different array structure. For example, as shown in FIGS. 1-2A, an antenna array A is a 2-row 8-column uniform linear array, and an antenna array B is a 4-row 4-column uniform linear array. Although the antenna array A and the antenna array B each have 16 antenna ports, the structures of their antenna arrays differ.

In addition, it should be specially pointed out that backward compatibility is an important factor to be considered in designing a new LTE R12 system or an LTE system of a higher version. For example, it is required that the LTE R12 system equipped with an AAS base station can ensure normal operating of UE in LTE R8-R10 systems or can prevent deterioration of operating performance of the UE. In this background, a new design scheme needs to be proposed about how to measure and report channel state information, so as to improve efficiency or performance of a communications system.

SUMMARY

Embodiments of the present application provide a method for reporting channel state information, user equipment, and a base station, and can improve system efficiency or performance.

According to a first aspect, a method for reporting channel state information CSI is provided, where the method includes: receiving a first reference signal set sent by a base station, where the first reference signal set includes at least two reference signals; sending first CSI to the base station, where the first CSI is determined according to the first reference signal set, and the first CSI includes a first rank indicator RI and/or a first precoding matrix indicator PMI; receiving a second reference signal set sent by the base station, where the second reference signal set is determined based on the first CSI, and the second reference signal set includes at least one reference signal; and sending second CSI to the base station, where the second CSI is determined according to the second reference signal set.

With reference to the first aspect, in a first possible implementation manner of the first aspect, the receiving a second reference signal set sent by the base station, where the second reference signal set is determined based on the first CSI, includes: receiving the second reference signal set sent by the base station, where the second reference signal set is determined based on the first RI included in the first CSI, or the second reference signal set is determined based on the first PMI included in the first CSI and a preset quantity of layers of a precoding matrix, or the second reference signal set is determined based on the first RI and the first PMI included in the first CSI.

With reference to the first aspect or the first possible implementation manner of the first aspect, in a second possible implementation manner of the first aspect, each reference signal included in the first reference signal set corresponds to an antenna in an antenna subarray of the base station, and each reference signal included in the second reference signal set corresponds to an antenna subarray of multiple antenna subarrays included in the base station.

With reference to the first aspect or either possible implementation manner in the first and second possible implementation manners of the first aspect, in a third possible implementation manner of the first aspect, the first RI is 2 raised to the power of an integer.

With reference to the first aspect or any possible implementation manner in the first to third possible implementation manners of the first aspect, in a fourth possible implementation manner of the first aspect, a sending period of the first reference signal set is longer than a sending period of the second reference signal set.

With reference to the first aspect or any possible implementation manner in the first to fourth possible implementation manners of the first aspect, in a fifth possible implementation manner of the first aspect, the sending first CSI to the base station, where the first CSI is determined according to the first reference signal set, includes: determining a first precoding matrix from a first codebook according to the first reference signal set; and sending the first CSI to the base station, where the first CSI includes the first rank indicator RI and/or the first precoding matrix indicator PMI, and the first PMI is used to indicate the first precoding matrix, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

With reference to the first aspect or any possible implementation manner in the first to fifth possible implementation manners of the first aspect, in a sixth possible implementation manner of the first aspect, the sending second CSI to the base station, where the second CSI is determined according to the second reference signal set, includes: determining a second precoding matrix from a second codebook according to the second reference signal set; and sending the second CSI to the base station, where the second CSI includes a second rank indicator RI and/or a second precoding matrix indicator PMI, and the second PMI is used to indicate the second precoding matrix, where the second codebook includes at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix} \text{ or } W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

where
$w=[1e^{j\varphi} \ldots e^{j(N-1)\varphi}]^T$, $v=[1e^{j\theta} \ldots e^{j(M-1)\theta}]^T$, $[\ ]^T$ denotes a matrix transpose, $\otimes$ denotes a Kronecker product, M and N are positive integers, and $\theta$, $\varphi$, and $\phi$ are phases.

With reference to the sixth possible implementation manner of the first aspect, in a seventh possible implementation manner of the first aspect, the phase $\theta=m\pi/16$, and $m=0, \ldots, 15$; or the phase $\varphi=n\pi/32$, and $n=0, \ldots, 31$; the phase $\phi=l\pi/2$, and $l=0, \ldots, 3$ or $l=0, 1$ and $n=0, \ldots, 31$.

According to a second aspect, a method for reporting channel state information is provided, where the method includes: sending a first reference signal set to user equipment, where the first reference signal set includes at least two reference signals; receiving first channel state information CSI sent by the user equipment, where the first CSI is determined based on the first reference signal set, and the first CSI includes a first rank indicator RI and/or a first precoding matrix indicator PMI; determining a second reference signal set according to the first CSI, where the second reference signal set includes at least one reference signal; sending the second reference signal set to the user equipment; and receiving second CSI sent by the user equipment, where the second CSI is determined based on the second reference signal set.

With reference to the second aspect, in a first possible implementation manner of the second aspect, the determining a second reference signal set according to the first CSI includes: determining the second reference signal set according to the first RI when the first CSI includes the first RI; or determining the second reference signal set according to the first PMI and a preset quantity of layers of a precoding matrix when the first CSI includes the first PMI; or determining the second reference signal set according to the first RI and the first PMI when the first CS1 includes the first RI and the first PMI.

With reference to the second aspect or the first possible implementation manner of the second aspect, in a second possible implementation manner of the second aspect, each reference signal included in the first reference signal set corresponds to an antenna in an antenna subarray of the base station, and each reference signal included in the second reference signal set corresponds to an antenna subarray of multiple antenna subarrays included in the base station.

With reference to the second aspect or either possible implementation manner in the first and second possible implementation manners of the second aspect, in a third possible implementation manner of the second aspect, the first RI is 2 raised to the power of an integer.

With reference to the second aspect or any possible implementation manner in the first to third possible implementation manners of the second aspect, in a fourth possible implementation manner of the second aspect, a sending period of the first reference signal set is longer than a sending period of the second reference signal set.

With reference to the second aspect or any possible implementation manner in the first to fourth possible implementation manners of the second aspect, in a fifth possible implementation manner of the second aspect, the first PMI is used to indicate a first precoding matrix determined by the user equipment from a first codebook according to the first reference signal set, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

With reference to the second aspect or any possible implementation manner in the first to fifth possible implementation manners of the second aspect, in a sixth possible implementation manner of the second aspect, the receiving second CSI sent by the user equipment includes: receiving the second CSI sent by the user equipment, where the second CSI includes a second rank indicator RI and/or a second precoding matrix indicator PMI, and the second PMI is used to indicate a second precoding matrix determined by the user equipment from a second codebook according to the second reference signal set, where the second codebook includes at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix}$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

where
$w=[1 e^{j\varphi} \ldots e^{j(N-1)\varphi}]^T$, $v=[1 e^{j\theta} \ldots e^{j(M-1)\theta}]^T$, $[\ ]^T$ denotes a matrix transpose, $\otimes$ denotes a Kronecker product, M and N are positive integers, and $\theta$, $\varphi$, and $\varphi$ are phases.

With reference to the sixth possible implementation manner of the second aspect, in a seventh possible implementation manner of the second aspect, the phase $\theta=m\pi/16$, and m=0, . . . , 15; or the phase $\varphi=n\pi/32$, and n=0, . . . , 31; or the phase $\varphi=l\pi/2$, and l=0, . . . , 3 or l=0, 1 and n=0, . . . , 31.

According to a third aspect, user equipment is provided, where the user equipment includes: a first receiving module, configured to receive a first reference signal set sent by a base station, where the first reference signal set includes at least two reference signals; a first sending module, configured to send first channel state information CSI to the base station, where the first CSI is determined according to the first reference signal set, and the first CSI includes a first rank indicator RI and/or a first precoding matrix indicator PMI; a second receiving module, configured to receive a second reference signal set sent by the base station, where the second reference signal set is determined based on the first CSI sent by the first sending module, and the second reference signal set includes at least one reference signal; and a second sending module, configured to send second CSI to the base station, where the second CSI is determined according to the second reference signal set received by the second receiving module.

With reference to the third aspect, in a first possible implementation manner of the third aspect, the second receiving module is specifically configured to: receive the second reference signal set sent by the base station, where the second reference signal set is determined based on the first RI included in the first CSI, or the second reference signal set is determined based on the first PMI included in the first CSI and a preset quantity of layers of a precoding matrix, or the second reference signal set is determined based on the first RI and the first PMI included in the first CSI.

With reference to the third aspect or the first possible implementation manner of the third aspect, in a second possible implementation manner of the third aspect, each reference signal included in the first reference signal set received by the first receiving module corresponds to an antenna in an antenna subarray of the base station, and each reference signal included in the second reference signal set received by the second receiving module corresponds to an antenna subarray of multiple antenna subarrays included in the base station.

With reference to the third aspect or either possible implementation manner in the first and second possible implementation manners of the third aspect, in a third possible implementation manner of the third aspect, the first RI is 2 raised to the power of an integer.

With reference to the third aspect or any possible implementation manner in the first to third possible implementation manners of the third aspect, in a fourth possible implementation manner of the third aspect, a sending period of the first reference signal set received by the first receiving module is longer than a sending period of the second reference signal set received by the second receiving module.

With reference to the third aspect or any possible implementation manner in the first to fourth possible implementation manners of the third aspect, in a fifth possible implementation manner of the third aspect, the first sending module is specifically configured to: determine a first precoding matrix from a first codebook according to the first reference signal set; and send the first CSI to the base station, where the first CSI includes the first rank indicator RI and/or the first precoding matrix indicator PMI, and the first PMI is used to indicate the first precoding matrix, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

With reference to the third aspect or any possible implementation manner in the first to fifth possible implementation manners of the third aspect, in a sixth possible implementation manner of the third aspect, the second sending module is specifically configured to: determine a second precoding matrix from a second codebook according to the second reference signal set; and send the second CSI to the base station, where the second CSI includes a second rank indicator RI and/or a second precoding matrix indicator PMI, and the second PMI is used to indicate the second precoding matrix, where the second codebook includes at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix}$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

where
$w=[1 e^{j\varphi} \ldots e^{j(N-1)\varphi}]^T$, $v=[1 e^{j\theta} \ldots e^{j(M-1)\theta}]^T$, $[\ ]^T$ denotes a matrix transpose, $\otimes$ denotes a Kronecker product, M and N are positive integers, and $\theta$, $\varphi$, and $\varphi$ are phases.

With reference to the sixth possible implementation manner of the third aspect, in a seventh possible implementation manner of the third aspect, the phase $\theta=m\pi/16$, and m=0, . . . , 15; or the phase $\varphi=n\pi/32$, and n=0, . . . , 31; or the phase $\varphi=l\pi/2$, and l=0, . . . , 3 or l=0, 1 and n=0, . . . , 31.

According to a fourth aspect, a base station is provided, where the base station includes: a first sending module, configured to send a first reference signal set to user equipment, where the first reference signal set includes at least two reference signals; a first receiving module, configured to receive first channel state information CSI sent by the user equipment, where the first CSI is determined based on the first reference signal set, and the first CSI includes a first rank indicator RI and/or a first precoding matrix indicator PMI; a determining module, configured to determine a second reference signal set according to the first CSI received by the first receiving module, where the second reference signal set includes at least one reference signal; a second sending module, configured to send the second reference signal set determined by the determining module to the user equipment; and a second receiving module, configured to receive second CSI sent by the user equipment, where the second CSI is determined based on the second reference signal set.

With reference to the fourth aspect, in a first possible implementation manner of the fourth aspect, the determining module is specifically configured to: determine the second reference signal set according to the first RI when the first CSI includes the first RI; or determine the second reference signal set according to the first PMI and a preset quantity of layers of a precoding matrix when the first CSI includes the first PMI; or determine the second reference signal set according to the first RI and the first PMI when the first CSI includes the first RI and the first PMI.

With reference to the fourth aspect or the first possible implementation manner of the fourth aspect, in a second possible implementation manner of the fourth aspect, each reference signal included in the first reference signal set sent by the first sending module corresponds to an antenna in an antenna subarray of the base station, and each reference signal included in the second reference signal set sent by the second sending module corresponds to an antenna subarray of multiple antenna subarrays included in the base station.

With reference to the fourth aspect or either possible implementation manner in the first and second possible implementation manners of the fourth aspect, in a third possible implementation manner of the fourth aspect, the first RI is 2 raised to the power of an integer.

With reference to the fourth aspect or any possible implementation manner in the first to third possible implementation manners of the fourth aspect, in a fourth possible implementation manner of the fourth aspect, a sending period of the first reference signal set is longer than a sending period of the second reference signal set.

With reference to the fourth aspect or any possible implementation manner in the first to fourth possible implementation manners of the fourth aspect, in a fifth possible implementation manner of the fourth aspect, the first PMI is used to indicate a first precoding matrix determined by the user equipment from a first codebook according to the first reference signal set, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

With reference to the fourth aspect or any possible implementation manner in the first to fifth possible implementation manners of the fourth aspect, in a sixth possible implementation manner of the fourth aspect, the second receiving module is specifically configured to: receive the second CSI sent by the user equipment, where the second CSI includes a second rank indicator RI and/or a second precoding matrix indicator PMI, and the second PMI is used to indicate a second precoding matrix determined by the user equipment from a second codebook according to the second reference signal set, where the second codebook includes at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix}$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

where
w=$[1e^{j\varphi} \ldots e^{j(N-1)\varphi}]^T$, v=$[1e^{j\theta} \ldots e^{j(M-1)\theta}]^T$, $[\ ]^T$ denotes a matrix transpose, $\otimes$ denotes a Kronecker product, M and N are positive integers, and $\theta$, $\varphi$, and $\varphi$ are phases.

With reference to the sixth possible implementation manner of the fourth aspect, in a seventh possible implementation manner of the fourth aspect, the phase $\theta=m\pi/16$, and m=0, ..., 15; or the phase $\varphi=n\pi/32$, and n=0, ..., 31; or the phase $\varphi=l\pi/2$, and l=0, ..., 3 or l=0, 1 and n=0, ..., 31.

Therefore, according to the method for reporting channel state information, the user equipment, and the base station in the embodiments of the present application, the user equipment may receive a first reference signal set sent by the base station, and determine first CSI according to the first reference signal set and send the first CSI to the base station. Because the first CSI provides preliminary information about a channel state between the base station and the user equipment, the base station can further determine a second reference signal set of the user equipment based on the preliminary information of the channel state, so that the user equipment can obtain second CSI more efficiently or more precisely according to the second reference signal set, thereby enhancing system efficiency or performance.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIGS. 1-1B is a schematic diagram of a cross polarization antenna configuration of a conventional base station;

FIGS. 1-2A is a schematic diagram of a uniform linear array antenna configuration of an AAS base station;

FIGS. 1-2B is a schematic diagram of a cross polarization antenna configuration of an AAS base station;

FIG. 2 is a schematic flowchart of a method for reporting channel state information according to an embodiment of the present application;

DESCRIPTION OF EMBODIMENTS

The following clearly describes the technical solutions in the embodiments of the present application in detail with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and the like.

It should also be understood that in the embodiments of the present application, user equipment (UE) may be referred to as a terminal, a mobile station (MS), a mobile terminal, and the like. The user equipment may communicate with one or more core networks over a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present application, a base station may be a base transceiver station (BTS) in GSM or CDMA, or may be a NodeB (NB) in WCDMA, or may be an evolved NodeB (eNB) in LTE, which is not limited in the present application. However, for ease of description, the following embodiments are described by using an eNB as an example.

Figures 1, 1A:
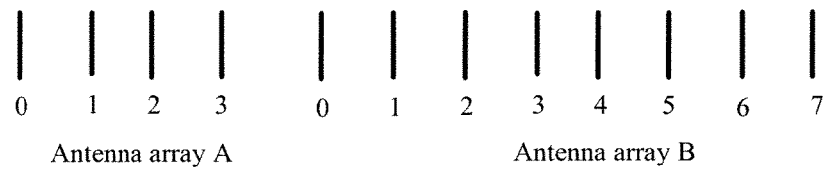
FIGS. 1-1A is a schematic diagram of a uniform linear array antenna configuration of a conventional base station.
Figures 1, 1B:
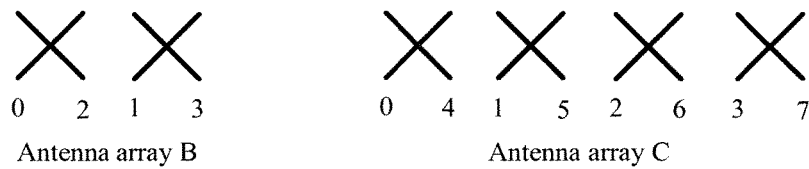
Figures 1, 2, 2A:
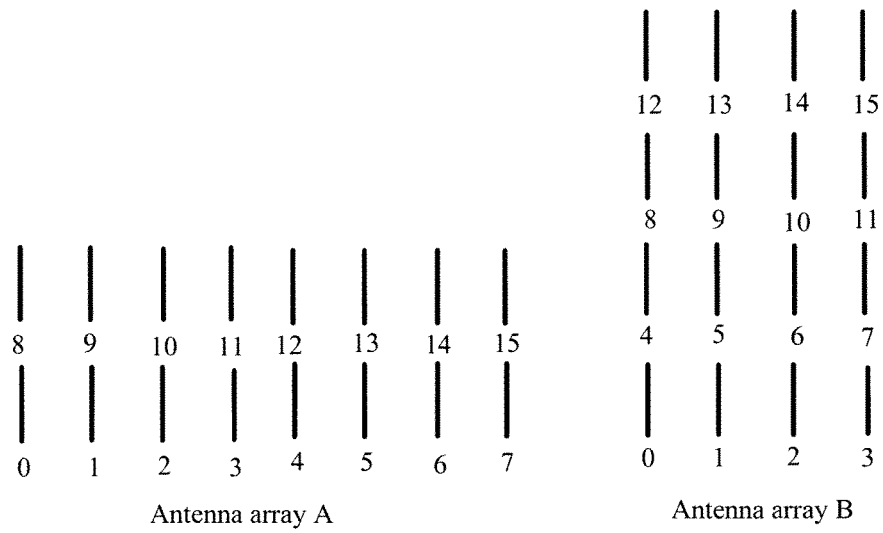
Figures 1, 2, 2B:
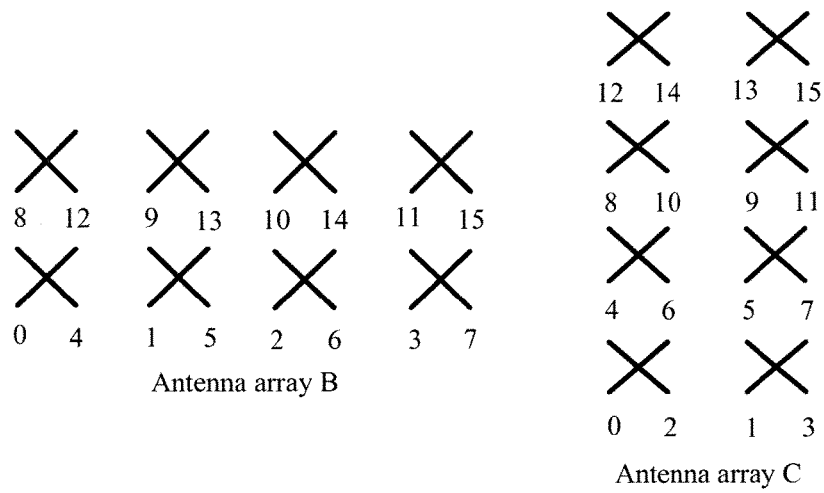
Figure 2:
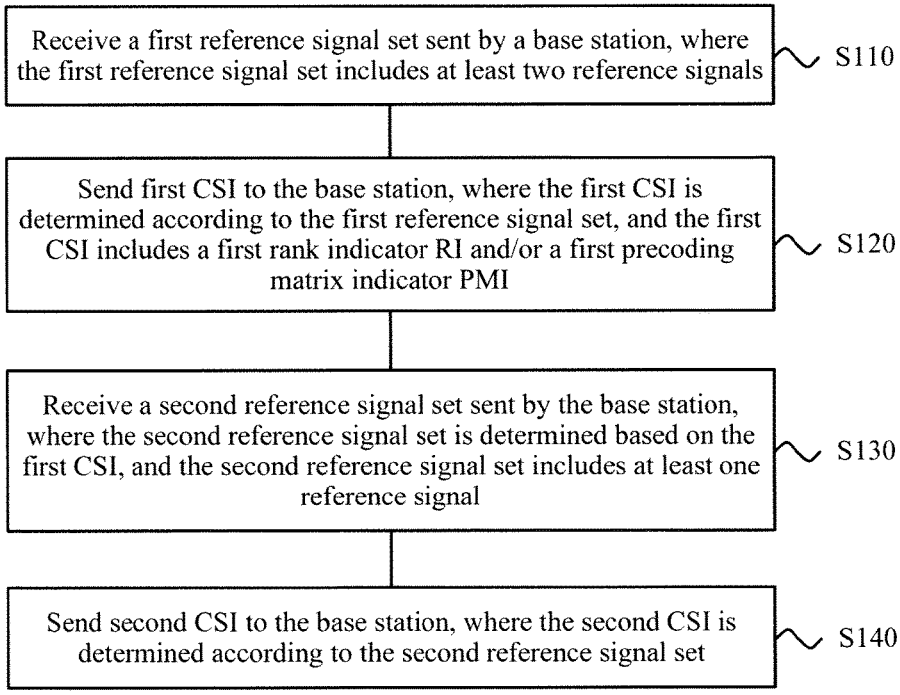

FIG. 2 is a schematic flowchart of a method 100 for reporting channel state information CSI according to an embodiment of the present application. The method 100 may be executed by user equipment. As shown in FIG. 2, the method 100 includes:

S110. Receive a first reference signal set sent by a base station, where the first reference signal set includes at least two reference signals.

S120. Send first CSI to the base station, where the first CSI is determined according to the first reference signal set, and the first CSI includes a first rank indicator RI and/or a first precoding matrix indicator PMI.

S130. Receive a second reference signal set sent by the base station, where the second reference signal set is determined based on the first CSI, and the second reference signal set includes at least one reference signal.

S140. Send second CSI to the base station, where the second CSI is determined according to the second reference signal set.

In this embodiment of the present application, the first reference signal set includes at least two reference signals, and the second reference signal set includes at least one reference signal. Each reference signal corresponds to one antenna port, each antenna port may correspond to a physical antenna or may correspond to a virtual antenna. The virtual antenna may be a weighted combination of multiple physical antennas. The user equipment may measure and report channel state information between the user equipment and the antenna port according to the reference signal corresponding to the antenna port.

Depending on a purpose or a function, a reference signal is generally classified into two types: one type of reference signal is used to measure a channel state or channel quality to implement scheduling; the other type of reference signal is used to perform coherent demodulation on a received signal that includes control information or data information. In an LTE R10 downlink system, a reference signal that is used for coherent demodulation is referred to as a demodulation reference signal (DMRS), and this reference signal is also referred to as a UE-specific reference signal (UE-specific reference signal). A reference signal that is used to measure channel state information is referred to as a channel state information reference signal (CSI-RS). The DMRS is sent together with a physical downlink shared channel (PDSCH), and is used for channel estimation in PDSCH demodulation. The CSI-RS is used by the user equipment in the LTE R10 system to measure a channel state, and is especially used for a multi-antenna transmission scenario. By means of channel measurement based on the CSI-RS, a rank indicator (RI), a precoding matrix indicator (PMI), a channel quality indicator (CQI), or other feedback information can be exported.

In addition, a cell-specific reference signal (CRS) may be used by the UE for channel estimation, so as to demodulate a downlink control channel and other common channels, where the reference signal is inherited from an LTE R8/9 system. In the LTE R8/9 system, the CRS is further used to measure channel state information and demodulate a data channel. In the LTE R10, the DMRS supports a maximum of 8 antenna ports, and a quantity of DMRS antenna ports used by each UE is notified to the UE by using downlink control information (DCI). In the LTE R10, the CSI-RS supports a maximum of 8 antenna ports, for example, a quantity of antenna ports may be 1, 2, 4, or 8. In the LTE R8-R10, a CRS supports a maximum of 4 antenna ports, for example, a quantity of antenna ports may be 1, 2, or 4. Compared with the CRS, the CSI-RS has a lower frequency density in order to support a same quantity of antenna ports, and therefore, has lower overheads.

In the prior art, for a base station equipped with an AAS or a two-dimensional antenna array, especially for a system equipped with a massive antenna (such as Massive MIMO), no efficient method for measuring and reporting channel state information is available. If the method for measuring and reporting channel state information is simply extended with reference to only a method for designing a conventional base station, for example, if an antenna port is configured for each physical antenna and each antenna port corresponds to a reference signal, overheads (such as time/frequency/code resources) occupied by reference signals sent on multiple antenna ports monotonically increase with the quantity of antenna ports. In addition, feedback overheads of channel state information corresponding to multiple antenna ports also increase accordingly, and complexity of calculating the channel state information measured by the user equipment is very high.

In this embodiment of the present application, user equipment may receive a first reference signal set sent by a base station, and determine first CSI according to the first reference signal set and send the first CSI to the base station. Because the first CSI provides preliminary information of a channel state between the base station and the user equipment, the base station can further determine a second reference signal set of the user equipment based on the preliminary information of the channel state. Therefore, the user equipment can obtain second CSI more efficiently or more precisely according to the second reference signal set, thereby enhancing system efficiency or performance.

For example, the first reference signal set may correspond to an antenna subset of an antenna set configured for the base station. Each reference signal in the first reference signal set may correspond to one antenna in the antenna subset, where the antenna subset may be far smaller than the antenna set. Optionally, the antenna subset has relatively strong spatial correlation or the antenna subset has a coarse-grained spatial resolution. The user equipment may obtain the first CSI according to the first reference signal set. The first CSI may include the first RI and/or the first PMI. The first RI can reflect spatial correlation information of a channel between the base station and the user equipment, and the first PMI can reflect spatial resolution information of the channel between the base station and the user equipment. Therefore, the second reference signal set may be determined based on the preliminary information (including the spatial correlation information and/or the spatial resolution information) provided in the first CSI, and further, the user equipment can obtain the second CSI more efficiently or more precisely based on the second reference signal set.

In order to reduce system expenditures, accomplish a higher system capacity and meet a higher coverage requirement, the AAS has been widely deployed and applied in practice. The following uses a cross polarization antenna array configuration shown in FIG. 3A and FIG. 3B as an example and uses a uniform linear array antenna configuration shown in FIG. 4A and FIG. 4B as an example to elaborate the method for reporting channel state information according to this embodiment of the present application. This embodiment of the present application is described by using merely an AAS antenna configuration as an example. However, the present application is not limited thereto, and the technical solution in this embodiment of the present application is also applicable to an antenna configuration of other systems.

Figure 3A:
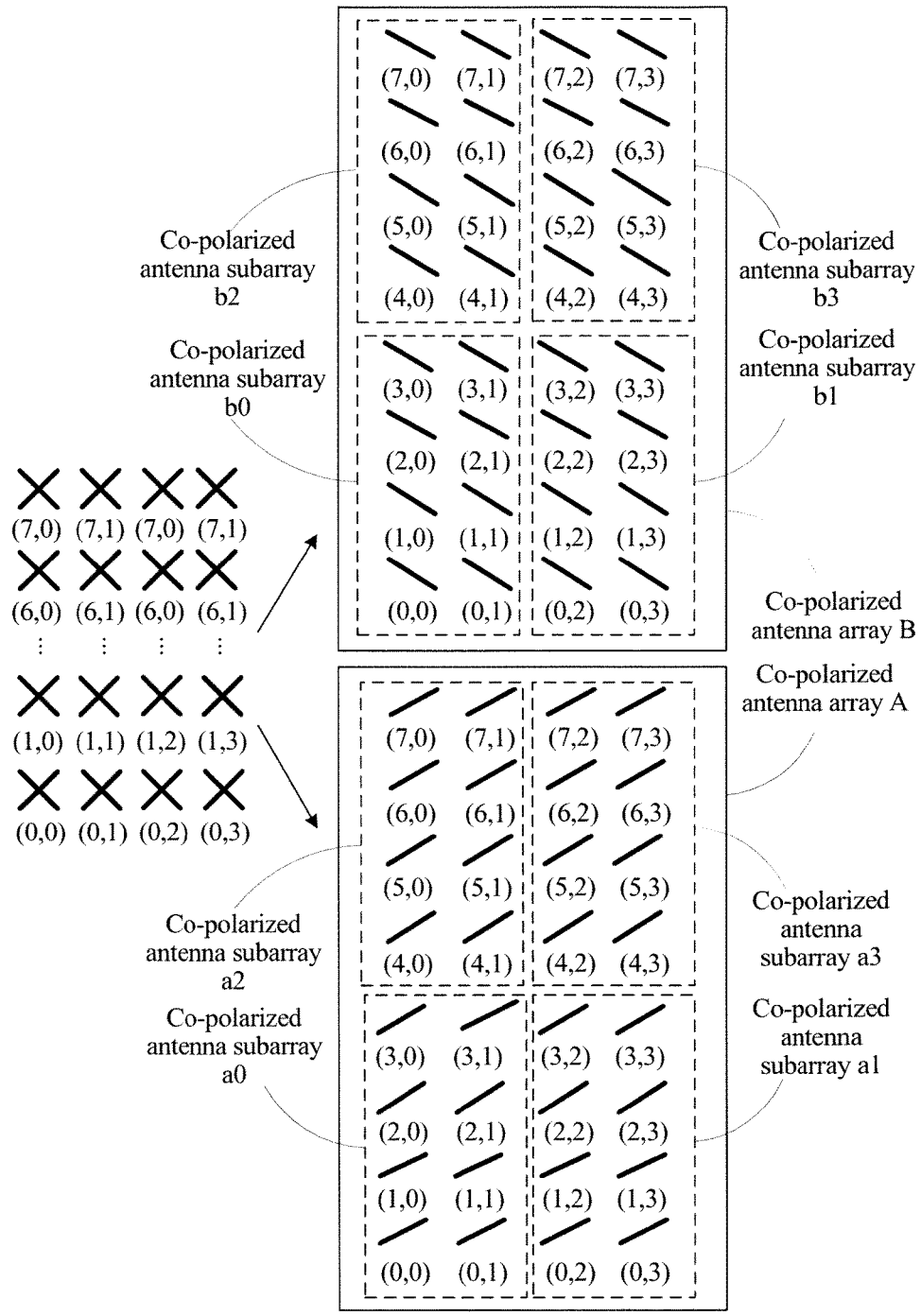
FIG. 3A and FIG. 3B are schematic diagrams of a cross polarization antenna array configuration applied in an embodiment of the present application.

FIG. 3A shows a dual-polarized antenna array that includes 64 antennas, where the antenna array may be divided into two co-polarized antenna arrays: a co-polarized antenna array A and a co-polarized antenna array B shown in FIG. 3A. The two co-polarized antenna arrays are formed by +45° polarized antennas and −45° polarized antennas respectively. For example, the co-polarized antenna array A may be further divided into 4 same antenna subarrays: co-polarized antenna subarrays a0, a1, a2, and a3 shown in FIG. 3A. Similarly, the co-polarized antenna array B may be further divided into 4 same antenna subarrays b0, b1, b2, and b3. Each of the antenna subarrays includes 8 antennas. It should be noted that the co-polarized antenna subarrays a0, a1, a2, and a3 are in same positions as the antenna subarrays b0, b1, b2, and b3 respectively. That is, the dual-polarized antenna array may be divided into a total of 8 antenna subarrays.

In this embodiment of the present application, optionally, the first reference signal set may be transmitted on only one of the antenna subarrays. Each reference signal included in the first reference signal set corresponds to an antenna in an antenna subarray of the base station. For example, the first reference signal set may be transmitted on only the co-polarized antenna subarray a0. That is, the first reference signal set may include 8 reference signals. Each of the reference signals is transmitted on one antenna in the co-polarized antenna subarray a0. Therefore, the user equipment UE can determine a first precoding matrix from a first codebook by receiving each reference signal in the first reference signal set transmitted by the base station on the co-polarized antenna subarray a0, where the first precoding matrix is a matrix in an 8-antenna precoding codebook. The user equipment may, by sending the first CSI to the base station, indicate the first precoding matrix determined by the user equipment, where the first CSI may include the first rank indicator RI and/or the first PMI. The first PMI may be used to indicate the first precoding matrix, and the first RI may be used to indicate a quantity of columns of the first precoding matrix, that is, a quantity of layers of the first precoding matrix. Further, the first CSI may further include other information such as a first channel quality indicator CQI.

It should be understood that the first rank RI of the first precoding matrix may also be a size of a maximal linearly independent group formed by all column vector sets of the first precoding matrix. It should also be understood that due to spatial correlation between antennas in an antenna subarray, the first RI is generally far smaller than a quantity $S_S$ of antennas included in the co-polarized antenna subarray, where $S_S$ is the size of the co-polarized antenna subarray. In addition, because the antenna subarray has a specific spatial resolution, the first precoding matrix determined by the user equipment by measuring the first reference signal set includes spatial directivity information of the channel between the base station and the user equipment. Therefore, the first CSI provided by the user equipment for the base station provides (by using the spatial directivity information) the base station with a coverage area of the second reference signal set sent to the user equipment.

Figure 3B:
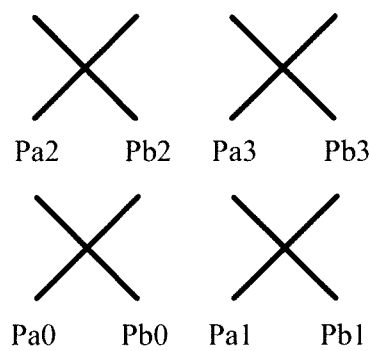

The base station may precode each antenna subarray (that is, the co-polarized antenna subarrays a0, a1, a2, a3, b0, b1, b2, and b3), so as to obtain the antenna port corresponding to each antenna subarray. The precoding matrix used by the base station for precoding each antenna subarray may be consistent with the first precoding matrix determined according to the first CSI sent by the user equipment, or may be a variation of the first precoding matrix determined according to the first CSI sent by the user equipment, for example, obtained by performing symmetric amplitude weighting on each column vector in the first precoding matrix. Using $RI_1=1$ as an example, the co-polarized antenna subarrays a0, a1, a2, a3, b0, b1, b2, and b3 are precoded separately to obtain $RI_1*N_S=8$ antenna ports, where $RI_1$ denotes the first rank indicator, and $N_S$ denotes the quantity of antenna subarrays. Each antenna port is a combination obtained by precoding a corresponding antenna subarray by using the first precoding matrix. For example, as shown in FIG. 3B, antenna ports Pa0, Pa1, Pa2, and Pa3 are antenna ports obtained by precoding the antenna subarrays a0, a1, a2, and a3 respectively; antenna ports Pb0, Pb1, Pb2, and Pb3 are antenna ports obtained by precoding the antenna subarrays b0, b1, b2, and b3 respectively. Similarly, using $RI_1=2$ as an example, the co-polarized antenna subarrays a0, a1, a2, a3, b0, b1, b2, and b3 may be precoded separately to obtain $RI_1*N_S=16$ antenna ports. Each of the antenna ports is a combination obtained by precoding a corresponding antenna subarray by using a column of the first precoding matrix.

Based on the first CSI fed back by the user equipment, the second reference signal set used by the user equipment and determined by the base station may include $RI_1*N_S$ reference signals. Using $RI_1=1$ as an example, the second reference signal set includes $RI_1*N_S=8$ reference signals. The reference signals may be transmitted on the antenna ports Pa0, Pa1, Pa2, and Pa3 and the antenna ports Pb0, Pb1, Pb2, and Pb3 respectively. In this case, based on the second reference signal set, the user equipment may calculate and report the second channel state information CSI, where the second CSI may include at least one of a second channel quality indicator CQI, a second precoding matrix indicator PMI, or a second rank indicator RI. It should be noted that the second CSI is state information corresponding to $RI_1*N_S$ antenna ports. Because $RI_1$ is generally far smaller than the size $S_S$ of the co-polarized antenna subarray, $RI_1*N_S$ is generally far smaller than $S_S*N_S=N_T$, where $N_T$ denotes a quantity of antennas included in the dual-polarized antenna array and also denotes the size of the dual-polarized antenna array.

Figure 4A:
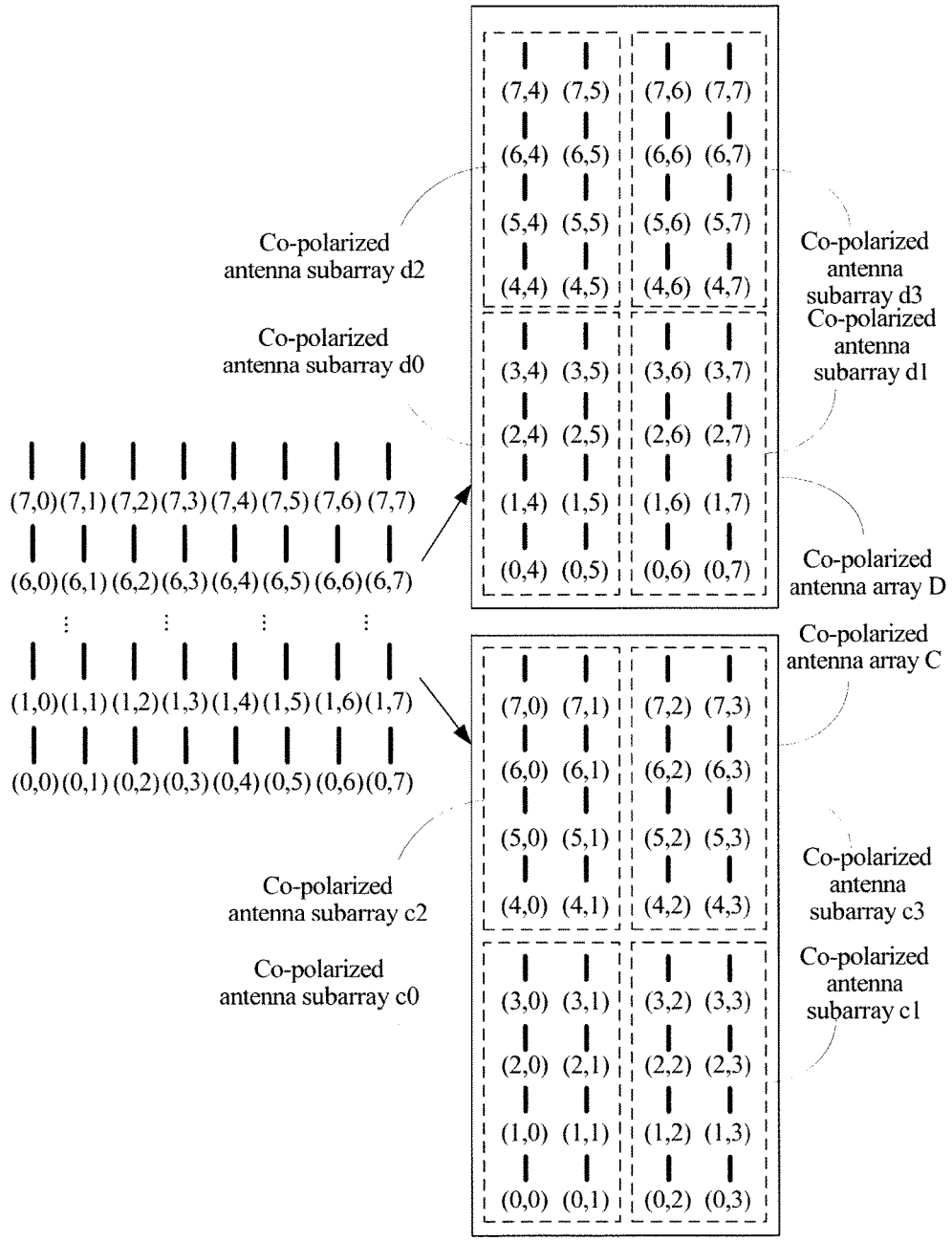
FIG. 4A and FIG. 4B are schematic diagrams of another uniform linear array antenna configuration applied in an embodiment of the present application.
Figure 4B:
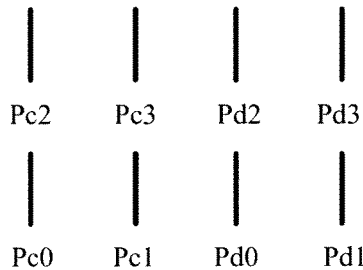

The foregoing has elaborated the method for reporting channel state information according to this embodiment of the present application with reference to the cross polarization antenna array configuration shown in FIG. 3A and FIG. 3B, and the following elaborates the method for reporting channel state information according to this embodiment of the present application with reference to a uniform linear array antenna configuration shown in FIG. 4A and FIG. 4B.

As shown in FIG. 4A, the uniform linear antenna array includes 64 antennas, and the array may be divided into two co-polarized antenna arrays: a co-polarized antenna array C and a co-polarized antenna array D shown in FIG. 4A. Both of the two co-polarized antenna arrays are formed by vertically polarized or 90° polarized antennas. The co-polarized antenna array C may be further divided into 4 same antenna subarrays: co-polarized antenna subarrays c0, c1, c2, and c3 shown in FIG. 4A. Similarly, the co-polarized antenna array D may be further divided into 4 same antenna subarrays d0, d1, d2, and d3. Each of the antenna subarrays includes 8 antennas. It should be noted that the co-polarized antenna subarrays c0, c1, c2, and c3 are in different positions than the antenna subarrays d0, d1, d2, and d3 respectively. That is, the dual-polarized antenna array may be divided into a total of 8 antenna subarrays.

In this embodiment of the present application, the first reference signal set may be transmitted on only one of the antenna subarrays, for example, transmitted on the co-polarized antenna subarray c0. That is, the first reference signal set may include 8 reference signals. Each of the reference signals is transmitted on one antenna in the co-polarized antenna subarray c0. Therefore, the user equipment UE can determine a first precoding matrix from a first codebook by receiving each reference signal in the first reference signal set transmitted by the base station on the co-polarized antenna subarray c0, where the first precoding matrix is a matrix in an 8-antenna precoding codebook. The user equipment may, by sending the first CSI to the base station, indicate the first precoding matrix determined by the user equipment, where the first CSI may include the first rank indicator RI and/or the first PMI. Further, the first CSI may further include other information such as a first channel quality indicator CQI. It should be understood that due to spatial correlation between antennas in an antenna subarray, the first RI is generally far smaller than a quantity $S_S$ of antennas included in the co-polarized antenna subarray, where $S_S$ is the size of the co-polarized antenna subarray. In addition, because the antenna subarray has a specific spatial resolution, the precoding matrix acquired by the user equipment by measuring the first reference signal set sent by the antenna subarray includes spatial directivity information of the channel between the base station and the user equipment. Therefore, the CSI information provided by the user equipment for the base station provides the base station with a coverage area of the second reference signal set sent to the user equipment.

The base station may precode each antenna subarray (including the co-polarized antenna subarrays c0, c1, c2, c3, and the co-polarized antenna subarrays d0, d1, d2, and b3), so as to obtain the antenna port corresponding to each antenna subarray. The precoding matrix used for precoding may be consistent with the first precoding matrix determined according to the first CSI sent by the user equipment, or the precoding matrix used for precoding is a variation of the first precoding matrix determined according to the first CSI sent by the user equipment, for example, obtained by performing symmetric amplitude weighting on each column vector in the first precoding matrix. Using $RI_1=1$ as an example, the co-polarized antenna subarrays c0, c1, c2, c3, and the co-polarized antenna subarrays d0, d1, d2, and d3 are precoded separately to obtain $RI_1*N_S=8$ antenna ports, where $RI_1$ denotes the first rank indicator, and $N_S$ denotes the quantity of antenna subarrays. Each antenna port is a combination obtained by precoding a corresponding antenna subarray by using the first precoding matrix. For example, as shown in FIG. 4B, the antenna ports Pc0, Pc1, Pc2, and Pc3 are antenna ports obtained by precoding the antenna subarrays c0, c1, c2, and c3 respectively; the antenna ports Pb0, Pb1, Pb2, and Pb3 are antenna ports obtained by precoding the antenna subarrays b0, b1, b2, and b3 respectively. Similarly, using $RI_1=2$ as an example, the co-polarized antenna subarrays c0, c1, c2, c3 and the co-polarized antenna subarrays d0, d1, d2, and d3 may be precoded separately to obtain $RI_1*N_S=16$ antenna ports. Each of the antenna ports is a combination obtained by precoding a corresponding antenna subarray by using a column of the first precoding matrix.

Based on the first CSI fed back by the user equipment, the second reference signal set used by the user equipment and determined by the base station includes $RI_1*N_S$ reference signals. Using $RI_1=1$ as an example, the second reference signal set includes $RI_1*N_S=8$ reference signals. The reference signals may be transmitted on the antenna ports Pc0, Pc1, Pc2, and Pc3 and the antenna ports Pd0, Pd1, Pd2, and Pd3 respectively. In this case, based on the second reference signal set, the user equipment may determine and report the second channel state information CSI, where the second CSI may include at least one of a second channel quality indicator CQI, a second precoding matrix indicator PMI, or a second rank indicator RI. It should be noted that the second CSI is state information corresponding to $RI_1*N_S$ antenna ports. Because $RI_1$ is generally far smaller than the size $S_S$ of the co-polarized antenna subarray, $RI_1*N_S$ is generally far smaller than $S_S*N_S N_T$, where $N_T$ denotes a quantity of antennas included in the dual-polarized antenna array and also denotes the size of the dual-polarized antenna array.

In summary, the user equipment measures reference signals included in the first reference signal set and the second reference signal set that are received, and feeds back the channel state information, where the first reference signal set uses $S_S$ reference signal ports and the second reference signal set uses $RI_1*N_S$ reference signal ports. When an intersection set of the two reference signal sets is an empty set, the system uses a total of $S_S+RI_1*N_S$ reference signal ports; and when one reference signal set is a subset of the other reference signal set, the system uses a total of $\max(S_S, RI_1*N_S)$ reference signal ports, where $\max(S_S, RI_1*N_S)$ denotes a larger value between $S_S$ and $RI_1*N_S$. In addition, the first reference signal set may have a same size as the second reference signal set. That is, the two reference signal sets have $S_S=RI_1*N_S$ reference signal ports. Further, the first reference signal set and the second reference signal set are the same reference signal set. Due to spatial correlation of the antenna subarray, $RI_1$ is generally far smaller than the size $S_S$ of the co-polarized antenna subarray. However, both $S_S+RI_1*N_S$ and $\max(S_S, RI_1*N_S)$ are smaller than the total quantity $N_T$ of antennas included in the antenna array. Therefore, according to the method in this embodiment of the present application, overheads of the reference signals can be reduced effectively, and system efficiency can be improved effectively.

In addition, the user equipment measures reference signals included in the first reference signal set and the second reference signal set that are received, and feeds back the first CSI and the second CSI. The first CSI is obtained based on $S_S$ reference signal ports used by the first reference signal set, and the second CSI is obtained based on $RI_1*N_S$ reference signal ports used by the second reference signal set, where $S_S$, $RI_1*N_S$, and $S_S+RI_1*N_S$ are all less than the total quantity $N_T$ of antenna ports. On the one hand, as regards the channel state information measurement of the $N_T$ antenna ports, using the same feedback overheads can greatly enhance CSI feedback precision of the $S_S$ or $S_S+RI_1*N_S$ antenna ports. In addition, when the first CSI includes the first PMI, feedback precision of the second CSI can be further enhanced based on the spatial resolution information provided by the first reference signal set. On the other hand, complexity of implementing CSI measurement of the $S_S$ or $S_S+RI_1*N_S$ antenna ports is generally far less than complexity of implementing CSI measurement of the $N_T$ antenna ports, and therefore, system performance can be improved effectively.

It should be understood that this embodiment of the present application is described by using merely the antenna array structure shown in FIG. 3A or FIG. 4A as an example. However, the present application is not limited thereto, and the method in this embodiment of the present application is also applicable to other antenna array structures such as an alternating polarization (alternating polarization) antenna array. In addition, the foregoing division of the antenna array is merely an example, and the antenna array may also be divided in other manners, for example, divided into 4 or 16 antenna subarrays. This embodiment of the present application is still applicable to, but is not limited to, the foregoing example.

Therefore, in the method for reporting channel state information according to this embodiment of the present application, user equipment acquires first CSI and second CSI respectively according to a first reference signal set and a second reference signal set that are sent by a base station, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. On the basis of spatial resolution provided by the first reference signal, the user equipment further measures channel state information CSI by using the second reference signal set, thereby enhancing CSI feedback precision, effectively reducing channel state information measurement complexity of the user equipment, and effectively improving system performance.

In this embodiment of the present application, optionally, each reference signal included in the first reference signal set corresponds to an antenna in an antenna subarray of the base station, and each reference signal included in the second reference signal set corresponds to an antenna subarray of multiple antenna subarrays included in the base station.

For example, as mentioned in the foregoing example, the first reference signal set may be transmitted on only the co-polarized antenna subarray a0 or c0. The 8 reference signals included in the first reference signal set are transmitted on one antenna in the co-polarized antenna subarray a0 or c0. That is, the first reference signal set corresponds to an antenna subarray a0 or c0. Each reference signal included in the first reference signal set corresponds to one antenna in an antenna subarray a0 of the base station, or corresponds to one antenna in an antenna subarray c0 of the base station. The quantity of reference signals included in the first reference signal set is equal to the quantity of antennas in the antenna subarray.

For example, still as mentioned in the foregoing example, the second reference signal set includes $RI_1*N_S$ reference signals. Each reference signal is transmitted on an antenna subarray of the 8 antenna subarrays a0, a1, a2, a3, b0, b1, b2, and b3. That is, each reference signal included in the second reference signal set corresponds to an antenna subarray of multiple antenna subarrays included in the base station. For example, each reference signal corresponds to the antenna subarray a0, a1, a2, a3, b0, b1, b2, or b3, where the quantity of reference signals included in the second reference signal set is equal to the quantity of antenna subarrays.

It should be understood that in this embodiment of the present application, the size of the first reference signal set may also be the same as the size of the second reference signal set. In addition, the first reference signal set and the second reference signal set occupy a same time-frequency resource in a resource block, or a time-frequency resource used by one of the two reference signal sets is a subset of a time-frequency resource used by the other reference signal set; however, the present application is not limited thereto.

Therefore, according to the method in this embodiment of the present application, spatial correlation of an antenna port corresponding to a first reference signal set can be fully utilized, so that reference signal overheads of a first reference signal set and a second reference signal set are far smaller than antenna overheads of transmitting reference signals or data, and system efficiency can be improved effectively. On the basis of spatial resolution provided by a first reference signal, user equipment further measures channel state information CSI by using a second reference signal set, thereby enhancing CSI feedback precision and effectively reducing channel state information measurement complexity of the user equipment.

For example, in S110, the user equipment receives the first reference signal set sent by the base station. For example, the user equipment receives the first reference signal set transmitted by the base station on the antenna subarray a0 or c0. Each reference signal included in the first reference signal set corresponds to an antenna in an antenna subarray of the base station.

In S120, the sending, by the user equipment, first channel state information CSI to the base station includes: determining, by the user equipment, a first precoding matrix from a first codebook according to the first reference signal set, and sending the first channel state information CSI to the base station, where the first CSI may include the first RI or include the first PMI, and may include the first RI and the first PMI, and the first PMI is used to indicate the first precoding matrix. Further, the first CSI may further include a first CQI and the like, and the present application is not limited thereto. For example, the user equipment performs channel estimation based on the reference signal included in the first reference signal set; and may select the first precoding matrix from the first codebook according to the channel estimation and a predefined criterion such as a channel capacity maximization criterion or a throughput maximization criterion. It should be understood that in this embodiment of the present application, the precoding matrix may be selected in multiple ways or based on multiple predefined criteria, which, for brevity, are not elaborated herein.

In S130, the user equipment may receive the second reference signal set sent by the base station, where the second reference signal set is determined based on the first CSI.

In this embodiment of the present application, optionally, the receiving a second reference signal set sent by the base station, where the second reference signal set is determined based on the first CSI, includes:

receiving the second reference signal set sent by the base station, where the second reference signal set is determined based on the first RI included in the first CSI, or the second reference signal set is determined based on the first PMI included in the first CSI and a preset quantity of layers of a precoding matrix, or the second reference signal set is determined based on the first RI and the first PMI included in the first CSI.

Specifically, in this embodiment of the present application, the first CSI may include only the first rank indicator RI, and the first RI is used to indicate a rank of the first precoding matrix. In this case, the second reference signal set may be determined according to the rank of the first precoding matrix. In this embodiment of the present application, the first RI may be further used to indicate a quantity of layers of the first precoding matrix. The quantity of layers of the first precoding matrix may be equal to a quantity of columns of the first precoding matrix, or may be a size of a maximal linearly independent subset formed by all column vector sets of the first precoding matrix.

Optionally, in this embodiment of the present application, the first RI or the preset quantity of layers of the precoding matrix is 2 raised to the power of an integer. For example, the first RI or the preset quantity of layers of the precoding matrix is 1, 2, 4, or 8 or the like.

Further, in this embodiment of the present application, optionally, the base station determines the second reference signal set according to the first RI included in the first CSI and a correspondence between the RI and the reference signal set. Specifically, for example, the base station determines the second reference signal set from at least two candidate reference signal sets according to a correspondence table between the RI and the reference signal set shown in Table 1 or Table 2, where $RI_1$ denotes the first RI.

TABLE 1

| | | Second reference signal set |
|---|---|---|
| $RI_1$ | Quantity of antenna ports | Antenna port number |
| 1 | 8 | x – x + 7 |
| 2 | 16 | x – x + 15 |
| 3 | 24 | x – x + 23 |
| 4 | 32 | x – x + 31 |

TABLE 2

| | | Second reference signal set | |
|---|---|---|---|
| $RI_1$ | Quantity of antenna ports | Antenna port number | Reference signal sequence initialization ID ($n_{SCID}$) |
| 1 | 8 | x – x + 7 | $n_{SCID}$ = 0 |
| 2 | 16 | x – x + 7 | $n_{SCID}$ = 0 |
|   |    | x – x + 7 | $n_{SCID}$ = 1 |
| 3 | 24 | x – x + 7 | $n_{SCID}$ = 0 |
|   |    | x – x + 7 | $n_{SCID}$ = 1 |
|   |    | x + 8 – x + 15 | $n_{SCID}$ = 0 |
| 4 | 32 | x – x + 7 | $n_{SCID}$ = 0 |
|   |    | x – x + 7 | $n_{SCID}$ = 1 |
|   |    | x + 8 – x + 15 | $n_{SCID}$ = 0 |
|   |    | x + 8 – x + 15 | $n_{SCID}$ = 1 |

In this embodiment of the present application, the first CSI may include only the first PMI and does not include the first RI. In this case, the second reference signal set may be determined according to the first PMI included in the first CSI and the preset quantity of layers of the precoding matrix, where the preset quantity of layers of the precoding matrix may be indicated by the predefined first RI.

Optionally, in this embodiment of the present application, the quantity, of layers of the precoding matrix, indicated by the predefined first RI is smaller than the size of the first reference signal set. The size of the first reference signal set may be the quantity of reference signal ports in the first reference signal set or the quantity of antenna ports corresponding to the first reference signal set. In this case, the quantity of layers of the first precoding matrix is predefined. That is, the quantity of layers of the first precoding matrix is equal to the value of the predefined first RI.

Specifically, the size of the second reference signal set is an integer multiple of the quantity of layers of the first precoding matrix, or an integer multiple of the predefined first RI; or the quantity of antenna ports corresponding to the second reference signal set is an integer multiple of the quantity of layers of the first precoding matrix, or an integer multiple of the predefined first RI.

For example, assuming that the value of the predefined first RI is L, the quantity of layers of the first precoding matrix is L, and the size of the second reference signal set or the quantity of antenna ports corresponding to the second reference signal set is an integer multiple of L, for example, L, 2L, or 3L, where L is a positive integer such as L=1, 2, or 3 or L=1, 2, 4, or 8.

Further, in this embodiment of the present application, the value of the predefined first RI may be determined according to the size of the first reference signal set or the quantity of antenna ports corresponding to the first reference signal set. Optionally, the value of the predefined first RI or the size of the first reference signal set is notified to the user equipment UE by using a broadcast channel or dedicated signaling.

Therefore, in this embodiment of the present application, when the first CSI includes only the first PMI, the first RI does not need to be fed back, thereby further reducing feedback overheads effectively.

It should be understood that in this embodiment of the present application, the first CSI may include the first PMI and the first RI. The second reference signal set is determined according to the first RI or the first PMI included in the first CSI, or may be determined according to both the first RI and the first PMI included in the first CSI, and the present application is not limited thereto.

Further, in this embodiment of the present application, optionally, the base station determines the second reference signal set according to the first RI and the first PMI included in the first CSI and a correspondence between the RI and PMI and the reference signal set. Optionally, the base station determines the second reference signal set according to the first PMI included in the first CSI, a predefined first RI, and the correspondence between the RI and PMI and the reference signal set.

Specifically, for example, the base station may determine the second reference signal set from at least two candidate reference signal sets according to a correspondence table between the first RI and first PMI and the second reference signal set shown in Table 3 or Table 4, where $R_1$ denotes the first RI and $PMI_1$ denotes the first PMI.

TABLE 3

| | | Second reference signal set | | |
|---|---|---|---|---|
| $RI_1$ | $PMI_1$ | Quantity of antenna ports | Antenna port number | Reference signal sequence initialization ID ($n_{SCID}$) |
| 1 | 0 | 8 | x – x + 7 | $n_{SCID}$ = 0 |
| | 1 | 8 | x – x + 7 | $n_{SCID}$ = 1 |
| | 2 | 8 | x – x + 7 | $n_{SCID}$ = 2 |
| | 3 | 8 | x – x + 7 | $n_{SCID}$ = 3 |
| 2 | 0 | 16 | x – x + 16 | $n_{SCID}$ = 0 |
| | 1 | 16 | x – x + 16 | $n_{SCID}$ = 1 |
| | 3 | 16 | x – x + 16 | $n_{SCID}$ = 2 |
| | 4 | 16 | x – x + 16 | $n_{SCID}$ = 3 |

TABLE 4

| | | Second reference signal set | | |
|---|---|---|---|---|
| $RI_1$ | $PMI_1$ | Quantity of antenna ports | Antenna port number | Reference signal sequence initialization ID ($n_{SCID}$) |
| 1 | 0 | 8 | x – x + 7 | $n_{SCID}$ = 0 |
| | 1 | 8 | x – x + 7 | $n_{SCID}$ = 1 |
| | 2 | 8 | x – x + 7 | $n_{SCID}$ = 2 |
| | 3 | 8 | x – x + 7 | $n_{SCID}$ = 3 |
| 2 | 0 | 16 | x – x + 7 | $n_{SCID}$ = 0 |
| | | | x – x + 7 | $n_{SCID}$ = 1 |
| | 1 | 16 | x – x + 7 | $n_{SCID}$ = 2 |
| | | | x – x + 7 | $n_{SCID}$ = 3 |
| | 3 | 16 | x – x + 7 | $n_{SCID}$ = 0 |

TABLE 4-continued

| | | Second reference signal set | | |
|---|---|---|---|---|
| $RI_1$ | $PMI_1$ | Quantity of antenna ports | Antenna port number | Reference signal sequence initialization ID ($n_{SCID}$) |
| | 4 | 16 | x – x + 7 | $n_{SCID}$ = 2 |
| | | | x – x + 7 | $n_{SCID}$ = 1 |
| | | | x – x + 7 | $n_{SCID}$ = 3 |

It should be understood that in Table 1 to Table 4, a resource used by each antenna port may be notified by the base station to the UE by using higher layer signaling. For example, a resource used by an antenna port x–x+7, x–x+15, x–x+23, or x–x+31 may be configured by an eNB for the UE by using higher layer signaling.

Optionally, in this embodiment of the present application, a sending period of the first reference signal set is longer than a sending period of the second reference signal set.

That is, a period of sending the first reference signal set by the base station is longer than a period of sending the second reference signal set. Because an antenna port used for measurement in the first reference signal set has stronger space or time or frequency correlation than an antenna port corresponding to the second reference signal set, and the change of a channel state thereof is relatively slow, a time interval or span of sending the first reference signal set may be longer, thereby further reducing overheads of a time-frequency resource occupied for sending the reference signal set.

Optionally, in this embodiment of the present application, the first CSI has a longer reporting period than the second CSI. For example, the reporting period of the first CSI is N times the reporting period of the second CSI, where N is a positive integer.

In this embodiment of the present application, optionally, in an embodiment, the precoding matrix included in the first codebook used by the user equipment for determining the first precoding matrix is a precoding matrix in a 2-antenna codebook, 4-antenna codebook, or 8-antenna codebook in an LTE R10 system, or is a precoding matrix in a 2-antenna codebook, 4-antenna codebook, or 8-antenna codebook in an LTE R12 system.

In this embodiment of the present application, optionally, in an embodiment, the precoding matrix included in the first codebook is a discrete Fourier transform (DFT) matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

It should be pointed out that the precoding matrix in the first codebook may be prestored on the user equipment side or on the base station side, or may be obtained by calculation according to a structure of the precoding matrix, for example, obtained by calculation according to a relationship between the first precoding matrix indicator and the precoding matrix, which, however, is not limited by this embodiment of the present application.

In S140, the user equipment sends the second CSI to the base station, where the second CSI is determined according to the second reference signal set.

Optionally, the second CSI includes the second channel quality indicator CQI. The second CQI may be calculated based on a transmit diversity transmission scheme. The transmit diversity scheme may be space frequency block coding (SFBC), space time block coding (STBC), or frequency switch transmit diversity (FSTD), or the like. The second CQI may also be calculated based on an open loop multiple input multiple output (MIMO) scheme. The open loop MIMO scheme may be a precoding scheme that is based on great-delay cyclic delay diversity and defined in the LTE R8 system.

Optionally, the sending second CSI to the base station, where the second CSI is determined according to the second reference signal set, includes:

determining a second precoding matrix from a second codebook according to the second reference signal set; and sending the second CSI to the base station, where the second CSI includes the second rank indicator RI and/or the second precoding matrix indicator PMI, and the second PMI is used to indicate the second precoding matrix.

In this embodiment of the present application, optionally, in an embodiment, the precoding matrix included in the second codebook is a precoding matrix in a 2-antenna codebook, 4-antenna codebook, or 8-antenna codebook in an LTE R10 system, or is a precoding matrix in a 2-antenna codebook, 4-antenna codebook, or 8-antenna codebook in an LTE R12 system.

In this embodiment of the present application, optionally, in an embodiment, the precoding matrix included in the second codebook is a discrete Fourier transform DTF matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

Optionally, in an embodiment, a precoding matrix W included in the second codebook is a product of two matrixes $W_1$ and $W_2$ where the matrix $W_1$ is a block diagonal matrix. The block diagonal matrix includes at least one block matrix X, and each block matrix X is a Kronecker product of two matrixes C and D.

Specifically, the precoding matrix W included in the second codebook may be determined according to the following equation (1):

$$W = W_1 W_2 \qquad (1)$$

$W_1$ is a block diagonal matrix and may be determined according to the following equation (2):

$$W_1 = \mathrm{diag}\{X_0, \ldots, X_{N_B-1}\}, \quad N_B \geq 2 \qquad (2)$$

The $k^{th}$ column $y_k$ of the matrix $W_2$ is determined according to the following equation (3):

$$y_k = \frac{1}{\sqrt{r}} \begin{bmatrix} e^{j\theta_{0,k}} y_{0,k}^T & e^{j\theta_{1,k}} y_{1,k}^T & \cdots & e^{j\theta_{N_B-1,k}} y_{N_B-1,k}^T \end{bmatrix}, \qquad (3)$$

$$k = 1, \ldots, r$$

The positive integer r is a rank of the precoding matrix W, and $r \geq 1$; a phase $\theta_{i,k}$ is a real number, $i=0, \ldots, N_B-1$, $k=1, \ldots, r$, and $N_B$ is a positive integer; and the column vector $y_{i,k}$ is a selection vector, in which a maximum of one element of the value 1 exists and remaining elements are all 0; j denotes a unit pure imaginary number, that is, $j=\sqrt{-1}$.

Referring to the example shown in FIG. 3A or 4A, in this embodiment of the present application, each block matrix $X_i$, $i=0, 1, \ldots, N_B-1$, may include one or more column vectors, and may be used to precode the antenna port that is generated by precoding the antenna subarray a0, a1, a2, a3, b0, b1, b2, or b3 (or from the antenna subarray c0, c1, c2, c3, d0, d1, d2, or d3) by using the first precoding matrix (in this case, $N_B$8). $y_{i,k}^T$ in the $k^{th}$ column $y_k$ of the matrix $W_2$ may be used to select a column in $X_i$ as an antenna port group for precoding, where the antenna port group is generated by using the first precoding matrix, where $e^{j\Theta_{i,k}}$ may be used to perform phase alignment on the precoding of different antenna port groups generated by using the first precoding matrix, so as to obtain a combined gain and greatly increase a signal to interference plus noise ratio (SINR) of a corresponding layer. Therefore, CSI feedback is performed by using the precoding matrix structure, and structure characteristics of the generated antenna array can be used to improve precision of the CSI feedback and effectively improve a system throughput or spectrum efficiency.

Optionally, in an embodiment, each block matrix $X_i$, $i=0, 1, \ldots, N_B-1$, may be a precoding matrix in a 2-antenna codebook, 4-antenna codebook, or 8-antenna codebook in the LTE R10 system.

Optionally, in an embodiment, each block matrix $X_i$, $i=0, 1, \ldots, N_B-1$, may be a discrete Fourier transform DFT matrix, a Hadamard matrix, a Householder matrix, or a Kronecker product of two DFT matrixes.

Optionally, in an embodiment, the block matrix $X_i$ may be a Kronecker product of a matrix $A_i$ and a matrix $B_i$. That is, the block matrix $X_i$ may be determined according to the following equation (4):

$$X_i = A_i \otimes B_i, \quad 0 \leq i \leq N_B - 1 \qquad (4)$$

Optionally, in an embodiment, the block matrix $X_i$, $i=0, 1, \ldots, N_B-1$ is determined according to the following equation (5):

$$X_i = e^{j\theta_i} X_0, \quad i=0,1,\ldots,N_B-1 \qquad (5)$$

The phase $\varphi_i$, $i=0, 1, \ldots, N_B-1$ is a real number. Specifically, the phase $\varphi_i$ may be determined according to the following equation (6) or (7):

$$\varphi_i = i \cdot \Delta\varphi, \qquad (6)$$
$$i = 0, 1, \ldots, N_B - 1$$

$$\varphi_i = \begin{cases} i \cdot \Delta\varphi, i = 0, 1, \ldots, N_B/2 - 1 \\ (i - N_B/2) \cdot \Delta\varphi, i = N_B/2, \ldots, N_B - 1 \end{cases} \qquad (7)$$

The phase difference $\Delta\varphi$ is a real number. Specifically, the value of $\Delta\varphi$ may be 0, $$\pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \pi,$$

or the like.

Optionally, in an embodiment, each column of the matrix $A_i$ or matrix $B_i$ in the block matrix $X_i = A_i \otimes B_i$, $i=0, 1, \ldots, N_B-1$ may be a discrete Fourier transform DFT vector or a column vector of a Householder matrix or Hadamard matrix, that is, may be determined according to the following equations (8) and (9):

$$A_i = [a_0 a_1 \ldots a_{N_a-1}] \qquad (8)$$

$$B_i = [b_0 b_1 \ldots b_{N_b-1}] \qquad (9)$$

The vector $a_k$ may may be determined according to the following equation (10), (11), or (12):

$$a_k \in \{f_0, f_1, \ldots, f_{N_f-1}\}, k=0, \ldots, N_a-1 \qquad (10)$$

$$a_k \in \{g_0, g_1, \ldots, g_{N_g-1}\}, k=0, \ldots, N_a-1 \qquad (11)$$

$$a_k \in \{h_0, h_1, \ldots, h_{N_h-1}\}, k=0, \ldots, N_a-1 \qquad (12)$$

The vector $b_l$ may be determined according to the following equation (13), (14), or (15):

$$b_l \in \{f_0, f_1, \ldots, f_{N_f-1}\}, l=0, \ldots, N_b-1 \quad (13)$$

$$b_l \in \{g_0, g_1, \ldots, g_{N_g-1}\}, l=0, \ldots, N_b-1 \quad (14)$$

$$b_l \in \{h_0, h_1, \ldots, h_{N_h-1}\}, l=0, \ldots, N_b-1 \quad (15)$$

$N_a$ and $N_b$ are quantities of columns of the matrix $A_i$ and the matrix $B_l$ respectively.

In this embodiment of the present application, optionally, the vector $f_n$, $n=0, \ldots, N_f-1$ is a DFT vector, and $N_f$ is a quantity of DFT vectors. For example, the DFT vector $f_n$ may be a column vector in the following DFT matrix F, as shown in the following equation (16):

$$[f_0 \; f_1 \; \cdots \; f_{N_i-1}] = \quad (16)$$

$$F \in \left\{ F_q = \left[ e^{i\frac{2\pi m}{N_i}(n+q/Q)} \right]_{N_i, N_i}, q = 0, 1, \ldots Q-1 \right\},$$

where $$e^{i\frac{2\pi m}{N_i}(n+q/Q)}$$

is an element in the $(m+1)^{th}$ row and the $(n+1)^{th}$ column of a DFT matrix $F_q$ that has $N_1$ rows and $N_f$ columns, and m, $n=0, 1, \ldots, N_f-1$, Q is a positive integer; and q/Q is a phase shift parameter, and multiple different DFT matrixes may be obtained by selecting Q and q.

In this embodiment of the present application, optionally, the vector $g_n$, $n=0, \ldots, N_g-1$ is a column vector of a Householder matrix G, and $N_g$ is a quantity of column vectors of the Householder matrix G. For example, the column vector $g_n$ may be a column vector in the following matrix G, as shown in the following equation (17):

$$[g_0 \; g_1 \; \ldots \; g_{N_g-1}] = G \in \{I - 2u_k u_k^H / u_k^H u_k\} \quad (17)$$

For example, the vector $u_k$ may may be shown in the following table:

TABLE 5

$u_0 = [1\; -1\; -1\; -1]^T$
$u_1 = [1\; -j\; 1\; j]^T$
$u_2 = [1\; 1\; -1\; 1]^T$
$u_3 = [1\; j\; 1\; -j]^T$
$u_4 = [1\; (-1-j)/\sqrt{2}\; -j\; (1-j)/\sqrt{2}]^T$
$u_5 = [1\; (1-j)/\sqrt{2}\; j\; (-1-j)/\sqrt{2}]^T$
$u_6 = [1\; (1+j)/\sqrt{2}\; -j\; (-1+j)/\sqrt{2}]^T$
$u_7 = [1\; (-1+j)/\sqrt{2}\; j\; (1+j)/\sqrt{2}]^T$
$u_8 = [1\; -1\; 1\; 1]^T$
$u_9 = [1\; -j\; -1\; -j]^T$
$u_{10} = [1\; 1\; 1\; -1]^T$
$u_{11} = [1\; j\; -1\; j]^T$
$u_{12} = [1\; -1\; -1\; 1]^T$
$u_{13} = [1\; -1\; 1\; -1]^T$
$u_{14} = [1\; 1\; -1\; -1]^T$
$u_{15} = [1\; 1\; 1\; 1]^T$ In this embodiment of the present application, optionally, the vector $h_n$, $n=0, \ldots, N_h-1$ is a column vector of a Hadamard matrix $H_{N_h}$, and $N_h$ is a quantity of column vectors of the Hadamard matrix $H_{N_h}$. For example, the column vector $h_n$ may be a column vector in the matrix $H_{N_h}$ shown in the following equation (18):

$$[h_0 \; h_1 \; \ldots \; h_{N_h-1}] = H_{N_h} \quad (18)$$

For example, when $N_h=2$ and $N_h=2^N$, the Hadamard matrix may be determined according to the following equations (19) and (20):

$$H_2 = \begin{bmatrix} 1 & 1 \\ 1 & -1 \end{bmatrix} \quad (19)$$

$$H_{2^N} = \underbrace{H_2 \otimes H_2 \otimes \ldots \otimes H_2}_{N \uparrow H_2}, \quad (20)$$

$$N = 1, 2, 3, 4, 5, \ldots$$

$\otimes$ denotes a Kronecker product of two matrixes.

In this embodiment of the present application, optionally, in an embodiment, the vector $a_k$ may also be determined according to (10') or (10"):

$$a_k = \text{diag}\{\alpha_0, \alpha_1, \ldots, \alpha_{\lfloor N_{a_k}/2 \rfloor-1}, \alpha_{\lfloor N_{a_k}/2 \rfloor}, \alpha_{\lfloor N_{a_k}/2 \rfloor-1},$$
$$\ldots, \alpha_1, \alpha_0\}a, k=0, \ldots, N_a-1 \quad (10'),$$

where a quantity $N_{a_k}$ of elements in the vector $a_k$ is an odd number; and $$a_k = \text{diag}\{\alpha_0, \alpha_1, \ldots, \alpha_{\lfloor N_{a_k}/2 \rfloor-1}, \alpha_{\lfloor N_{a_k}/2 \rfloor}, \alpha_{\lfloor N_{a_k}/2 \rfloor},$$
$$\alpha_{\lfloor N_{a_k}/2 \rfloor-1}, \ldots, \alpha_1, \alpha_0\}a, k=0, \ldots, N_a-1 \quad (10''),$$

where the quantity $N_{a_k}$ of elements in the vector $a_k$ is an even number, $\alpha_m$ is a real number, $m=0, 1, \ldots, \lfloor N_{a_k}/2 \rfloor$, $\lfloor N_{a_k}/2 \rfloor$ denotes a maximum integer that is not greater than $N_{a_k}/2$, and the vector a in (10') or (10") is: $a \in \{f_0, f_1, \ldots, f_{N_f-1}\}$, $a \in \{g_0, g_1, \ldots, g_{N_g-1}\}$ or $a \in \{h_0, h_1, \ldots, h_{N_h-1}\}$.

In this embodiment of the present application, optionally, in an embodiment, the vector $b_l$ may also be determined according to (13') or (13"):

$$b_l = \text{diag}\{\beta_0, \beta_1, \ldots, \beta_{\lfloor N_{b_l}/2 \rfloor-1}, \beta_{\lfloor N_{b_l}/2 \rfloor},$$
$$\beta_{\lfloor N_{b_l}/2 \rfloor-1}, \ldots, \beta_1, \beta_0\}b, l=0, \ldots, N_b-1 \quad (13'),$$

where a quantity $N_{b_l}$ of elements in the vector $b_l$ is an odd number; or $$b_l = \text{diag}\{\beta_0, \beta_1, \ldots, \beta_{\lfloor N_{b_l}/2 \rfloor-1}, \beta_{\lfloor N_{b_l}/2 \rfloor}, \beta_{\lfloor N_{b_l}/2 \rfloor},$$
$$\beta_{\lfloor N_{b_l}/2 \rfloor-1}, \ldots, \beta_1, \beta_0\}b, l=0, \ldots, N_b-1 \quad (13''),$$

where the quantity $N_{b_l}$ of the elements in the vector $b_l$ is an even number, $\beta_m$ is a real number, $m=0, 1, \ldots, \lfloor N_{b_l}/2 \rfloor$, $\lfloor N_{b_l}/2 \rfloor$ denotes a maximum integer that is not greater than $N_{b_l}/2$. The vector b in (11') or (11") is $b \in \{f_0, f_1, \ldots, f_{N_f-1}\}$, $b \in \{g_0, g_1, \ldots, g_{N_g-1}\}$ or $b \in \{h_0, h_1, \ldots, h_{N_h-1}\}$.

Optionally, the matrix $A_i$ or the matrix $B_l$ may also be a precoding matrix in a 2-antenna codebook or 4-antenna codebook in the LTE R8 system, or a precoding matrix in an 8-antenna codebook in the LTE R10 system, or a precoding matrix in a 4-antenna codebook in the LTE R12 system.

Optionally, in another embodiment, either of the matrix $A_i$ and the matrix $B_l$ may be 1. For example, if $A_i=1$, $X_i=B_l$, where $B_l$ may be shown in equations (9), (13) to (20), and (13') or (13"); or if $B_l=1$, $X_i=A_i$, where $A_i$ may be shown in equations (8), (10) to (12), (16) to (20), and (10') or (10").

Optionally, in another embodiment, in a structure of the $k^{th}$ column $y_k$ of the matrix $W_2$ shown in equation (3), the phase $\theta_{i,k}$ meets the following equation (21):

$$\theta_{i+N_B/2, k} = \theta_{i,k} + i \cdot \Delta\theta_k, \; i=0, 1, \ldots, N_B/2-1,$$
$$k=1, \ldots, r \quad (21)$$

The phase difference $\Delta\theta_k$ is a real number. Specifically, the value of $\Delta\theta_k$ may be $$0, \pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \pi,$$

or the like.

Optionally, in an embodiment, in the structure of the $k^{th}$ column $y_k$ of the matrix $W_2$ shown in equation (3), the phase $\theta_{i,k}$ meets the following equation (22) or (23):

$$\theta_{i,k} = i \cdot \Delta\theta_k, \quad (22)$$
$$i = 0, 1, \ldots, N_B - 1,$$
$$k = 1, \ldots, r$$

$$\theta_{i,k} = \begin{cases} i \cdot \Delta\theta_k, \ i = 0, 1, \ldots, N_B/2 - 1 \\ (i - N_B/2) \cdot \Delta\theta_k, \\ \quad i = N_B/2, \ldots, N_B - 1 \end{cases}, k = 1, \ldots, r \quad (23)$$

The phase difference $\Delta\theta_k$ is a real number. Specifically, the value of $\Delta\theta_k$ may be $$0, \pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \pi,$$

or the like.

Optionally, in another embodiment, in the structure of the $k^{th}$ column $y_k$ of the matrix $W_2$ shown in equation (3), the vector $y_{i,k}$ meets the following equation (24):

$$y_{i+N_B/2,k} = y_{i,k}, \ i=0,1,\ldots,N_B/2-1, k=1,\ldots,r \quad (24)$$

Further, the vector $y_{i,k}$ meets the following equation (25) or (26):

$$y_{i,k} = y_{0,k}, \ i=0,1,\ldots,N_B-1, k=1,\ldots,r \quad (25)$$

$$y_{i+N_B/2,k} = -y_{i,k}, \ i=0,1,\ldots,N_B/2-1, k=1,\ldots,r \quad (26)$$

Using FIG. 3B and FIG. 4B as an example in which the size of the second reference signal set is 8, that is, the second reference signal set corresponds to 8 antenna ports, the precoding matrix W may have the following structure:

$$W = W_1 W_2 \quad (27)$$

$$W_1 \text{diag} \{X_0, X_1\} \quad (28)$$

The block matrixes $X_0$ and $X_1$ are:

$$X_1 = X_0 = A_0 \otimes B_0 \quad (29)$$

or $$X_1 = X_0 = B_0 \otimes A_0 \quad (30)$$

Optionally, in an embodiment, $A_0$ is:

$$A_0 = a_0 \quad (31)$$

where $$a_0 \in \{f_0, f_1\} \quad (32)$$

$$[f_0 \ f_1] = \text{diag}\{1, e^{jn\pi/16}\} F_2, \quad (33)$$
$$n = 0, 1, \ldots, 7$$

$$F_2 = \frac{1}{\sqrt{2}} \times \begin{bmatrix} 1 & 1 \\ 1 & j \end{bmatrix} \quad (34)$$

or $$a_0 \in \{h_0, h_1\} \quad (35)$$

$$[h_0 \ h_1] = \frac{1}{\sqrt{2}} \times H_2, \quad (36)$$

where $H_2$ is a $2^{nd}$ order Hadamard matrix, and the matrix $B_0$ is:

$$B_0 \in \{[b_{(2k)mod32} \ b_{(2k+1)mod32} \ b_{(2k+2)mod32} \ b_{(2k+3)mod32}]: k = 0, 1, \ldots, 15\} \quad (37)$$

$$b_{(2k+1)mod32} = [e^{j\frac{2\pi \cdot 0 \cdot ((2k+l)mod32)}{32}} \ e^{j\frac{2\pi \cdot 1 \cdot ((2k+l)mod32)}{32}} \ e^{j\frac{2\pi \cdot 2 \cdot ((2k+l)mod32)}{32}} \ e^{j\frac{2\pi \cdot 2 \cdot ((2k+l)mod32)}{32}}], \quad (38)$$

$$l = 0, 1, 2, 3,$$

where x mod y denotes an operation of x modulo y, j denotes a unit pure imaginary number, that is, $j=\sqrt{-1}$; or the matrix $B_0$ is a precoding matrix in a 4-antenna rank-4 codebook in the LTE R8 system.

$$W_2 \in \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad (39)$$

$$Y \in \{\tilde{e}_1, \tilde{e}_2, \tilde{e}_3, \tilde{e}_4\} \quad (40)$$

or $$W_2 \in \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad (41)$$

$$(Y_1, Y_2) \in \{(\tilde{e}_1, \tilde{e}_1), (\tilde{e}_2, \tilde{e}_2), (\tilde{e}_3, \tilde{e}_3), \quad (42)$$
$$(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\},$$

where $\tilde{e}_n$, n=1, 2, 3, 4 denotes a 4×1 selection vector, and among its elements, the $n^{th}$ element is 1, and all remaining elements are 0.

Optionally, in another embodiment, an example is used in which a quantity of block matrixes is $N_B=4$ and the size of the second reference signal set is 16, that is, the second reference signal set corresponds to 16 antenna ports, the precoding matrix W may have the following structure:

$$W = W_1 W_2 \quad (43)$$

where $$W_1 = \text{diag} \{X_0, \ldots, X_{N_B-1}\}, N_B=4 \quad (44)$$

$$X_1 = e^{j\varphi_1} X_0, X_3 = e^{j\varphi_3} X_2 \quad (45),$$

where the phases $\varphi_1$ and $\varphi_3$ are real numbers, and a value of $\varphi_1$ or $\varphi_3$ may be $$0, \pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \pi,$$

and so on. Further, in this embodiment of the present application, $X_2=X_0$, $X_3=X_1$. In this case, $\varphi_3=\varphi_1$.

Optionally, in another embodiment, the block matrixes $X_0$ and $X_2$ are:

$$X_2 = X_0 = A_0 \otimes B_0 \tag{46}$$

or $$X_2 = X_0 = B_0 \otimes A_0 \tag{47}$$

Optionally, in an embodiment, $A_0$ is:

$$A_0 = a_0 \tag{48}$$

where $$a_0 \in \{f_0, f_1, \ldots, f_3\} \tag{49}$$

$$[f_0, f_1, f_2, f_3] = \mathrm{diag}\{1, e^{jn\pi/16}, e^{jn\pi/8}, e^{j3n\pi/16}\}F_4, \tag{50}$$
$$n = 0, 1, \ldots, 7$$

$$F_4 = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix}; \tag{51}$$

or $$a_0 \in \{h_0, h_1, \ldots, h_3\} \tag{52}$$

$$[h_0, h_1, \ldots, h_3] = \frac{1}{2} \times H_4, \tag{53}$$

where $H_4$ is a $4^{th}$ order Hadamard matrix, and the matrix $B_0$ is:

$$B_0 \in \{[\, b_{(2k)\bmod 32} \;\; b_{(2k+1)\bmod 32} \;\; b_{(2k+2)\bmod 32} \;\; b_{(2k+3)\bmod 32}\,]: \tag{54}$$
$$k = 0, 1, \ldots, 15\}$$

$$b_{(2k+l)\bmod 32} = \begin{bmatrix} e^{j\frac{2\pi \cdot 0 \cdot ((2k+l)\bmod 32)}{32}} & e^{j\frac{2\pi \cdot 1 \cdot ((2k+l)\bmod 32)}{32}} \\ e^{j\frac{2\pi \cdot 2 \cdot ((2k+l)\bmod 32)}{32}} & e^{j\frac{2\pi \cdot 3 \cdot ((2k+l)\bmod 32)}{32}} \end{bmatrix}^T, \tag{55}$$

$$l = 0, 1, 2, 3,$$

where x mod y denotes an operation of x modulo y, j denotes a unit pure imaginary number, that is, $j=\sqrt{-1}$; or the matrix $B_0$ is a precoding matrix in a 4-antenna rank-4 codebook in the LTE R8 system.

Optionally, in another embodiment, the matrix $W_2$ may be:

$$W_2 \in \left\{ \frac{1}{2}\begin{bmatrix} Y \\ e^{j\theta_{1,1}} Y \\ Y \\ e^{j\theta_{1,1}} Y \end{bmatrix}, \frac{1}{2}\begin{bmatrix} Y \\ e^{j\theta_{1,1}} Y \\ jY \\ je^{j\theta_{1,1}} Y \end{bmatrix}, \frac{1}{2}\begin{bmatrix} Y \\ e^{j\theta_{1,1}} Y \\ -Y \\ -e^{j\theta_{1,1}} Y \end{bmatrix}, \frac{1}{2}\begin{bmatrix} Y \\ e^{j\theta_{1,1}} Y \\ -jY \\ -je^{j\theta_{1,1}} Y \end{bmatrix} \right\} \tag{56}$$

$$Y \in \{\tilde{e}_1, \tilde{e}_2, \tilde{e}_3, \tilde{e}_4\}, \tag{57}$$

where $\tilde{e}_n$, n=1, 2, 3, 4 denotes a 4×1 selection vector, and among its elements, the $n^{th}$ element is 1, and all remaining elements are 0. $\theta_{1,1}$ is a real number, and its value may be, for example, $$0, \pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \text{ or } \pi.$$

Optionally, in another embodiment, the matrix $W_2$ may be:

$$W_2 \in \left\{ \frac{1}{2\sqrt{2}}\begin{bmatrix} Y_1 & Y_2 \\ e^{j\theta_{1,1}} Y_1 & e^{j\theta_{1,2}} Y_2 \\ Y_1 & -Y_2 \\ e^{j\theta_{1,1}} Y_1 & -e^{j\theta_{1,2}} Y_2 \end{bmatrix}, \frac{1}{2\sqrt{2}}\begin{bmatrix} Y_1 & Y_2 \\ e^{j\theta_{1,1}} Y_1 & e^{j\theta_{1,2}} Y_2 \\ jY_1 & -jY_2 \\ je^{j\theta_{1,1}} Y_1 & -je^{j\theta_{1,2}} Y_2 \end{bmatrix} \right\} \tag{58}$$

$$(Y_1, Y_2) \in \{(\tilde{e}_1, \tilde{e}_1), (\tilde{e}_2, \tilde{e}_2), (\tilde{e}_3, \tilde{e}_3), \\ (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}, \tag{59}$$

where $\tilde{e}_n$, n=1, 2, 3, 4 denotes a 4×1 selection vector, and among its elements, the $n^{th}$ element is 1, and all remaining elements are 0. $\theta_{1,1}$ and $\theta_{1,2}$ are real numbers, and the value of $\theta_{1,1}$ or $\theta_{1,2}$ may be $$0, \pm\frac{\pi}{64}, \pm\frac{\pi}{32}, \pm\frac{\pi}{16}, \pm\frac{\pi}{8}, \pm\frac{\pi}{4}, \pm\frac{\pi}{2}, \pi,$$

and so on.

Optionally, in another embodiment, an example is used in which a quantity of block matrixes is $N_B=2$ and there are 16 transmit antennas, matrixes that form the precoding matrix W may be:

$$A_i = [a_0 \; a_1], i=1, 2 \tag{60}$$

$$a_0, a_1 \in \{f_0, f_1, \ldots, f_3\} \tag{61}$$

or $$a_0, a_1 \in \{h_0, h_1, \ldots, h_3\} \tag{62},$$

where the vector $f_i$, i=0, ..., 3 and the vector $h_i$, i=0, ..., 3 are shown in the foregoing equations.

The matrix $B_i$, i=1, 2 may be shown in the foregoing equation, or the matrix $B_i$ is a precoding matrix in a 4-antenna rank-4 codebook in the LTE R8 system.

Optionally, in another embodiment, the matrix $W_2$ may be:

$$W_2 \in \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\} \tag{63}$$

$$Y \in \{e_1, e_2, e_3, e_4, e_5, e_6, e_7, e_8\} \tag{64}$$

or $$W_2 \in \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\} \tag{65}$$

$$(Y_1, Y_2) \in \{(e_1, e_1), (e_2, e_2), (e_3, e_3), \\ (e_4, e_4), (e_1, e_2), (e_2, e_3), (e_1, e_4), (e_2, e_4)\}, \tag{66}$$

where $e_n$, n=1, 2, ..., 8 denotes an 8×1 selection vector, and among its elements, the $n^{th}$ element is 1, and all remaining elements are 0.

Further, the determining a second precoding matrix from a second codebook according to the second reference signal set includes:

selecting a second precoding matrix from a codebook subset based on the second reference signal set.

The codebook subset may be predefined; or may be reported by the UE to the eNB, and then determined by the base station eNB based on the reporting of the UE and notified to the UE; or may be a codebook subset determined and reported by the UE, for example, a recently reported codebook subset. Therefore, feedback overheads and implementation complexity can be further reduced.

Optionally, the codebook subset may include a subset of the matrix or $W_1$ or matrix $A_i$ or matrix $B_i$ or matrix $W_2$.

Optionally, all codebook subsets have a same subset of the matrix $W_1$ or matrix $A_i$ or matrix $B_i$ or matrix $W_2$. Therefore, the codebook subsets overlap each other, which can address an edge effect of channel state information quantization.

Optionally, in the precoding matrix, the block matrixes and and $X_i$ and $X_j$, i≠j may be unequal or equal. If $X_i$ and $X_j$, i≠j are equal, the equal matrixes $X_i$ and $X_j$, i≠j may appear in pairs, which can further reduce feedback overheads.

It should be understood the matrix $A_i$ or the matrix $B_l$ may also be in other forms, which is not described exhaustively herein. In addition, it should be noted that each matrix may be further multiplied by a scaling factor to implement power normalization or power balance.

In this embodiment of the present application, optionally, the second codebook includes at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix} \quad (67)$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix}, \quad (68)$$

where w and v are an N-dimensional column vector or an M-dimensional column vector, $\otimes$ denotes a Kronecker product, M and N are positive integers, and $\varphi$ is a phase.

Optionally, the column vectors W or v may be:

$$w=[1 e^{j\varphi} \ldots e^{j(N-1)\varphi}]^T \quad (69)$$

$$v=[1 e^{j\theta} \ldots e^{j(M-1)\theta}]^T \quad (70),$$

where $[\ ]^T$ denotes a matrix transpose, and $\theta$ and $\varphi$ are phases.

Optionally, the phase $\theta = m\pi/16$ and m=0, ..., 15; or optionally, the phase $\varphi = n\pi/32$, and n=0, ..., 31; or optionally, the phase $\varphi = l\pi/2$, and l=0, ..., 3 or l=0, 1.

Optionally, in another embodiment, the method 100 further includes:

receiving a third reference signal set sent by the base station, where the third reference signal set is determined based on the second CSI; and determining and reporting third channel state information CSI based on the third reference signal set.

Optionally, the second CSI may be the second RI and/or the second PMI.

It should be pointed out that the precoding matrix in the first codebook may be prestored on the user equipment side or on the base station side, or may be obtained by calculation according to a structure of the precoding matrix, for example, obtained by calculation according to a relationship between the first precoding matrix indicator and the precoding matrix, which, however, is not limited by this embodiment of the present application. In addition, it should be understood that in each embodiment of the present application, the precoding matrix structure in the codebook related to each process described above is not limited to being used for two or more CSI measurement processes in the method. For example, the precoding matrix structure mentioned in (67) to (70) may be used for the third CSI measurement and reporting process described above, or used for a CSI measurement process based on a single reference signal set. For example, the CSI measurement process is similar to a CSI measurement process based on a CRS in the LTE R8 system or based on a CSI-RS in the LTE R8 system, which is not further described in detail herein. In addition, it should be pointed out that, in this embodiment of the present application, a scalar is a special case of a vector, and vector is a special case of a matrix.

It should be understood that in this embodiment of the present application, the size of the first reference signal set may also be the same as the size of the second reference signal set. In addition, the first reference signal set and the second reference signal set occupy a same time-frequency resource in a resource block, or a time-frequency resource used by one of the two reference signal sets is a subset of a time-frequency resource used by the other reference signal set; however, the present application is not limited thereto. For example, the first reference signal set and the second reference signal set may use a cell-specific reference signal CRS or a channel state information reference signal CSI-RS in an LTE system, and the first CSI and the second CSI may be based on a codebook based on the LTE R8 or R10 or R12. In this way, backward compatibility of the system can be kept.

It should be understood that in various embodiments of the present application, a value of a sequence number in the foregoing processes does not indicate an execution sequence, and an execution sequence of each process is determined by its function and internal logic, which shall not constitute any limitation to an implementation process of an embodiment of the present application.

Therefore, in the method for reporting channel state information according to this embodiment of the present application, user equipment acquires first CSI and second CSI respectively according to a first reference signal set and a second reference signal set that are sent by a base station, where the second reference signal set used by the user equipment is obtained according to a first rank indicator RI and/or a first PMI in the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. On the basis of spatial resolution provided by the first reference signal, the user equipment further measures channel state information CSI by using the second reference signal set, thereby enhancing CSI feedback precision, effectively reducing channel state information measurement complexity of the user equipment, and effectively improving system performance.

Figure 5:
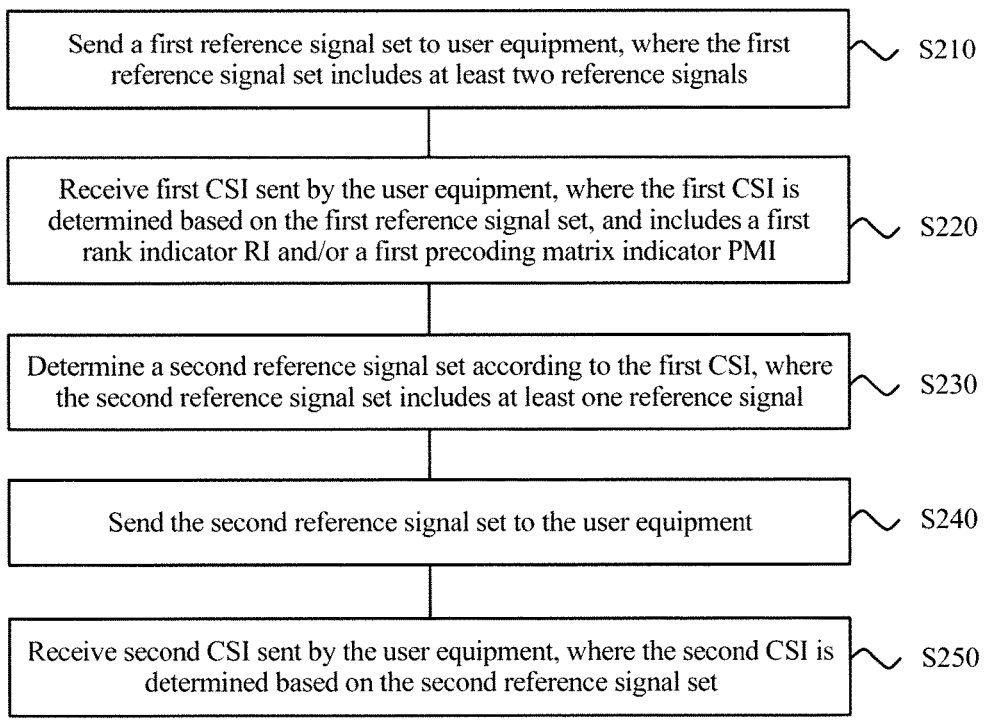
FIG. 5 is another schematic flowchart of a method for reporting channel state information according to an embodiment of the present application.

The foregoing has elaborated a method for reporting channel state information according to this embodiment of the present application from a perspective of user equipment with reference to FIG. 1 to FIG. 4B, and the following describes a method for reporting channel state information according to an embodiment of the present application from a perspective of a base station with reference to FIG. 5.

FIG. 5 shows a method 200 for reporting channel state information according to an embodiment of the present application, where the method 200 may be executed by a base station. As shown in FIG. 5, the method 200 includes:

S210. Send a first reference signal set to user equipment, where the first reference signal set includes at least two reference signals.

S220. Receive first CSI sent by the user equipment, where the first CSI is determined based on the first reference signal set, and the first CSI includes a first rank indicator RI and/or a first precoding matrix indicator PMI.

S230. Determine a second reference signal set according to the first CSI, where the second reference signal set includes at least one reference signal.

S240. Send the second reference signal set to the user equipment.

S250. Receive second CSI sent by the user equipment, where the second CSI is determined based on the second reference signal set.

Therefore, in the method for reporting channel state information according to this embodiment of the present application, the base station sends the first reference signal set and the second reference signal set, and the user equipment acquires the first CSI and the second CSI according to the first reference signal set and the second reference signal set respectively, where the second reference signal set sent by the base station to the user equipment is determined according to the first CSI. Because the first CSI provides preliminary information about a channel state between the base station and the user equipment, the base station can further determine the second reference signal set of the user equipment based on the preliminary information of the channel state, so that the user equipment can obtain the second CSI more efficiently or more precisely according to the second reference signal set, thereby enhancing system efficiency or performance.

For example, the first reference signal set may correspond to an antenna subset of an antenna set configured for the base station. Each reference signal in the first reference signal set may correspond to one antenna in the antenna subset, where the antenna subset may be far smaller than the antenna set. Optionally, the antenna subset has relatively strong spatial correlation or the antenna subset has a coarse-grained spatial resolution. The user equipment may obtain the first CSI according to the first reference signal set. The first CSI may include the first RI and/or the first PMI. The first RI can reflect spatial correlation information of a channel between the base station and the user equipment, and the first PMI can reflect spatial resolution information of the channel between the base station and the user equipment. Therefore, the second reference signal set may be determined based on the preliminary information (including the spatial correlation information and/or the spatial resolution information) provided in the first CSI, and further, the user equipment can obtain the second CSI more efficiently or more precisely based on the second reference signal set.

Still using a dual-polarized antenna array including 64 antennas and shown in FIG. 3A as an example, the antenna array includes a co-polarized antenna array A and a co-polarized antenna array B. The co-polarized antenna array A includes co-polarized antenna subarrays a0, a1, a2, and a3, and the co-polarized antenna array B includes antenna subarrays b0, b1, b2, and b3. The dual-polarized antenna array can be divided into a total of 8 antenna subarrays, and each antenna subarray includes 8 antennas.

The base station may transmit the first reference signal set on only one of the antenna subarrays, for example, on the co-polarized antenna subarrays a0. That is, the first reference signal set may include 8 reference signal ports, and reference signals are transmitted through each of the reference signal ports on one antenna in the co-polarized antenna subarray a0. The user equipment UE can determine a first precoding matrix from a first codebook by receiving each reference signal in the first reference signal set transmitted by the base station on the co-polarized antenna subarray a0, where the first precoding matrix is a matrix in an 8-antenna precoding codebook. The user equipment may, by sending the first CSI to the base station, indicate the first precoding matrix determined by the user equipment, where the first CSI may include the first rank indicator RI and/or the first PMI. The first PMI may be used to indicate the first precoding matrix, and the first RI may be used to indicate a quantity of columns of the first precoding matrix, that is, a quantity of layers of the first precoding matrix. Further, the first CSI may further include other information such as a first channel quality indicator CQI. It should be understood that the first rank RI of the first precoding matrix may also be a size of a maximal linearly independent subset formed by all column vector sets of the first precoding matrix. It should also be understood that due to spatial correlation between antennas in an antenna subarray, the first RI is generally far smaller than a quantity $S_S$ of antennas included in the co-polarized antenna subarray, where $S_S$ is the size of the co-polarized antenna subarray. In addition, because the antenna subarray has a specific spatial resolution, the first precoding matrix determined by the user equipment by measuring the first reference signal set includes spatial directivity information of the channel between the base station and the user equipment. Therefore, the first CSI provided by the user equipment for the base station provides (by using the spatial directivity information) the base station with a coverage area of the second reference signal set sent to the user equipment.

The base station may precode each antenna subarray (that is, the co-polarized antenna subarrays a0, a1, a2, a3, b0, b1, b2, and b3), so as to obtain the antenna port corresponding to each antenna subarray. The precoding matrix used by the base station for precoding each antenna subarray may be consistent with the first precoding matrix determined according to the first CSI sent by the user equipment, or may be a variation of the first precoding matrix determined according to the first CSI sent by the user equipment, for example, obtained by performing symmetric amplitude weighting on each column vector in the first precoding matrix. Using $RI_1=1$ as an example, the co-polarized antenna subarrays a0, a1, a2, a3, b0, b1, b2, and b3 are precoded separately to obtain $RI_1 * N_S = 8$ antenna ports, where $RI_1$ denotes the first rank indicator, and $N_S$ denotes the quantity of antenna subarrays. Each antenna port is a combination obtained by precoding a corresponding antenna subarray by using the first precoding matrix. For example, as shown in FIG. 3B, antenna ports Pa0, Pa1, Pa2, and Pa3 are antenna ports obtained by precoding the antenna subarrays a0, a1, a2, and a3 respectively; antenna ports Pb0, Pb1, Pb2, and Pb3 are antenna ports obtained by precoding the antenna subarrays b0, b1, b2, and b3 respectively. Similarly, using $RI_1=2$ as an example, the co-polarized antenna subarrays a0, a1, a2, a3, b0, b1, b2, and b3 may be precoded separately to obtain $RI_1*N_S=16$ antenna ports. Each of the antenna ports is a combination obtained by precoding a corresponding antenna subarray by using a column of the first precoding matrix.

Based on the first CSI fed back by the user equipment, the second reference signal set used by the user equipment and determined by the base station may include $RI_1*N_S$ reference signals. Using $RI_1=1$ as an example, the second reference signal set includes $RI_1*N_S=8$ reference signals. The reference signals may be transmitted on the antenna ports Pa0, Pa1, Pa2, and Pa3 and the antenna ports Pb0, Pb1, Pb2, and Pb3 respectively. In this case, based on the second reference signal set, the user equipment may calculate and report the second channel state information CSI, where the second CSI may include at least one of a second channel quality indicator CQI, a second precoding matrix indicator PMI, or a second rank indicator RI. It should be noted that the second CSI is state information corresponding to $RI_1*N_S$ antenna ports. Because $RI_1$ is generally far smaller than the size $S_S$ of the co-polarized antenna subarray, $RI_1*N_S$ is generally far smaller than $S_S*N_S=N_T$, where $N_T$ denotes a quantity of antennas included in the dual-polarized antenna array and also denotes the size of the dual-polarized antenna array.

Therefore, in the method for reporting channel state information according to this embodiment of the present application, a base station sends a first reference signal set and a second reference signal set to user equipment, so that the user equipment acquires first CSI and second CSI, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

It should be understood that this embodiment of the present application is described by using merely the antenna array structure shown in FIG. 3A as an example. However, the present application is not limited thereto, and the method in this embodiment of the present application is also applicable to other antenna array structures such as a uniform linear array or an alternating polarization array.

In this embodiment of the present application, optionally, the determining a second reference signal set according to the first CSI includes:

determining the second reference signal set according to the first RI when the first CSI includes the first RI; or determining the second reference signal set according to the first PMI and a preset quantity of layers of a precoding matrix when the first CSI includes the first PMI; or determining the second reference signal set according to the first RI and the first PMI when the first CSI includes the first RI and the first PMI.

In this embodiment of the present application, optionally, each reference signal included in the first reference signal set corresponds to an antenna in an antenna subarray of the base station, and each reference signal included in the second reference signal set corresponds to an antenna subarray of multiple antenna subarrays included in the base station.

In this embodiment of the present application, the first RI may also be used to indicate the quantity of layers of the first precoding matrix, and the quantity of layers of the first precoding matrix may be equal to the quantity of columns of the first precoding matrix.

In this embodiment of the present application, optionally, the first RI is 2 raised to the power of an integer. Optionally, the preset quantity of layers of the precoding matrix is 2 raised to the power of an integer. For example, the first RI is 1, 2, 4, or 8.

Further, in this embodiment of the present application, optionally, the base station determines the second reference signal set according to the first RI included in the first CSI and a correspondence between the RI and the reference signal set. Specifically, for example, the base station determines the second reference signal set from at least two candidate reference signal sets according to a correspondence table between the RI and the reference signal set shown in Table 1 or Table 2, where $RI_1$ denotes the first RI.

In this embodiment of the present application, the first CSI may include only the first PMI and does not include the first RI. In this case, the second reference signal set may be determined according to the first PMI included in the first CSI and the preset quantity of layers of the precoding matrix, where the preset quantity of layers of the precoding matrix may be indicated by the predefined first RI.

Optionally, in this embodiment of the present application, the quantity, of layers of the precoding matrix, indicated by the predefined first RI is smaller than the size of the first reference signal set. The size of the first reference signal set may be the quantity of reference signal ports in the first reference signal set or the quantity of antenna ports corresponding to the first reference signal set. In this case, the quantity of layers of the first precoding matrix is predefined. That is, the quantity of layers of the first precoding matrix is equal to the value of the predefined first RI.

Specifically, the size of the second reference signal set is an integer multiple of the quantity of layers of the first precoding matrix, or an integer multiple of the predefined first RI; or the quantity of antenna ports corresponding to the second reference signal set is an integer multiple of the quantity of layers of the first precoding matrix, or an integer multiple of the predefined first RI.

For example, assuming that the value of the predefined first RI is L, the quantity of layers of the first precoding matrix is L, and the size of the second reference signal set or the quantity of antenna ports corresponding to the second reference signal set is an integer multiple of L, for example, L, 2L, or 3L, where L is a positive integer such as L=1, 2, or 3 or L=1, 2, 4, or 8.

Further, in this embodiment of the present application, the value of the predefined first RI may be determined according to the size of the first reference signal set or the quantity of antenna ports corresponding to the first reference signal set. Optionally, the value of the predefined first RI or the size of the first reference signal set is notified to the user equipment UE by using a broadcast channel or dedicated signaling.

Therefore, in this embodiment of the present application, when the first CSI includes only the first PMI, the first RI does not need to be fed back, thereby further reducing feedback overheads effectively.

It should be understood that in this embodiment of the present application, the first CSI may include the first PMI and the first RI. The second reference signal set is determined according to the first RI included in the first CSI, or may be determined according to both the first RI and the first PMI included in the first CSI, and the present application is not limited thereto.

Further, in this embodiment of the present application, optionally, the base station determines the second reference signal set according to the first RI and the first PMI included in the first CSI and a correspondence between the RI and PMI and the reference signal set. Optionally, the base station determines the second reference signal set according to the first PMI included in the first CSI, a predefined first RI, and the correspondence between the RI and PMI and the reference signal set.

Specifically, for example, the base station may determine the second reference signal set from at least two candidate reference signal sets according to a correspondence table between the first RI and first PMI and the second reference signal set shown in Table 3 or Table 4, where $RI_1$ denotes the first RI and $PMI_1$ denotes the first PMI.

In this embodiment of the present application, optionally, a sending period of the first reference signal set is longer than a sending period of the second reference signal set. That is, a period of sending the first reference signal set by the base station is longer than a period of sending the second reference signal set. Because an antenna port used for measurement in the first reference signal set has stronger space or time or frequency correlation than an antenna port corresponding to the second reference signal set, and the change of a channel state thereof is relatively slow, a time interval or span of sending the first reference signal set may be longer, thereby further reducing overheads of a time-frequency resource occupied for sending the reference signal set.

Optionally, in this embodiment of the present application, the first CSI has a longer reporting period than the second CSI. For example, the reporting period of the first CSI is N times the reporting period of the second CSI, where N is a positive integer.

In this embodiment of the present application, optionally, the precoding matrix included in the first codebook is a discrete Fourier transform DTF matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

In this embodiment of the present application, optionally, the receiving the second CSI sent by the user equipment includes:

receiving the second CSI sent by the user equipment, where the second CSI includes the second rank indicator RI and/or the second precoding matrix indicator PMI, and the second PMI is used to indicate a second precoding matrix determined by the user equipment from a second codebook according to the second reference signal set.

In this embodiment of the present application, optionally, a precoding matrix W included in the second codebook is a product of two matrixes $W_1$ and $W_2$, where the matrix $W_1$ is a block diagonal matrix. The block diagonal matrix includes at least one block matrix X, and each block matrix X is a Kronecker product of two matrixes C and D.

In this embodiment of the present application, optionally, the second codebook includes at least one precoding matrix W, and the precoding matrix W has a structure determined according to equation (67) or (68):

$$W = (2NM)^{-\frac{1}{2}} \begin{bmatrix} w \otimes v \\ e^{j\varphi} w \otimes v \end{bmatrix} \quad (67)$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix}, \quad (68)$$

where w and v are an N-dimensional column vector or an M-dimensional column vector, $\otimes$ denotes a Kronecker product, M and N are positive integers, and $\varphi$ is a phase.

Optionally, the column vectors w or v may be:

$$w = [1\, e^{j\varphi} \ldots\, e^{j(N-1)\varphi}]^T \quad (69)$$

$$v = [1\, e^{j\theta} \ldots\, e^{j(M-1)\theta}]^T \quad (70),$$

where $[\;]^T$ denotes a matrix transpose, and $\theta$ and $\varphi$ are phases.

Optionally, the phase $\theta = m\pi/16$, and $m = 0, \ldots, 15$; or optionally, the phase $\varphi = n\pi/32$, and $n = 0, \ldots, 31$; or optionally, the phase $\varphi = l\pi/2$, and $l = 0, \ldots, 3$ or $l = 0.1$.

Optionally, in this embodiment of the present application, the method 200 further includes:

determining a third reference signal set according to the second CSI;

sending the third reference signal set to the user equipment; and receiving third CSI sent by the user equipment according to the third reference signal set, where the third CSI includes a third rank indicator RI and/or a third precoding matrix indicator PMI, and the third RI and the third PMI are used to indicate a third precoding matrix determined by the user equipment from a third codebook according to the third reference signal set.

Optionally, the second CSI may be the second RI and/or the second PMI.

It should be pointed out that the precoding matrix in the first codebook or the second codebook or the third codebook may be prestored on the user equipment side or on the base station side, or may be obtained by calculation according to a structure of the precoding matrix, for example, obtained by calculation according to a relationship between the first precoding matrix indicator and the precoding matrix, which, however, is not limited by this embodiment of the present application. In addition, it should be understood that in each embodiment of the present application, the precoding matrix structure in the codebook related to each process described above is not limited to being used for two or more CSI measurement processes in the method. For example, the precoding matrix structure mentioned in (67) to (70) may be used for the third CSI measurement and reporting process described above, or used for a CSI measurement process based on a single reference signal set. For example, the CSI measurement process is similar to a CSI measurement process based on a CRS in the LTE R8 system or based on a CSI-RS in the LTE R8 system, which is not further described in detail herein.

It should be understood that in this embodiment of the present application, the size of the first reference signal set may also be the same as the size of the second reference signal set. In addition, the first reference signal set and the second reference signal set occupy a same time-frequency resource in a resource block, or a time-frequency resource used by one of the two reference signal sets is a subset of a time-frequency resource used by the other reference signal set; however, the present application is not limited thereto. For example, the first reference signal set and the second reference signal set may use a cell-specific reference signal CRS or a channel state information reference signal CSI-RS in an LTE system, and the first CSI and the second CSI may be based on a codebook based on the LTE R8 or R10 or R12. In this way, backward compatibility of the system can be kept.

It should be understood that in various embodiments of the present application, a value of a sequence number in the foregoing processes does not indicate an execution sequence, and an execution sequence of each process is determined by its function and internal logic, which shall not constitute any limitation to an implementation process of an embodiment of the present application.

Therefore, in the method for reporting channel state information according to this embodiment of the present application, a base station sends a first reference signal set and a second reference signal set to user equipment, so that the user equipment acquires first CSI and second CSI, where the second reference signal set used by the user equipment is determined according to a first rank indicator RI and/or a first PMI in the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

The foregoing has elaborated a method for reporting channel state information according to this embodiment of the present application with reference to FIG. 1 to FIG. 5, and the following elaborates user equipment and a base station according to an embodiment of the present application with reference to FIG. 6 to FIG. 9.

Figure 6:
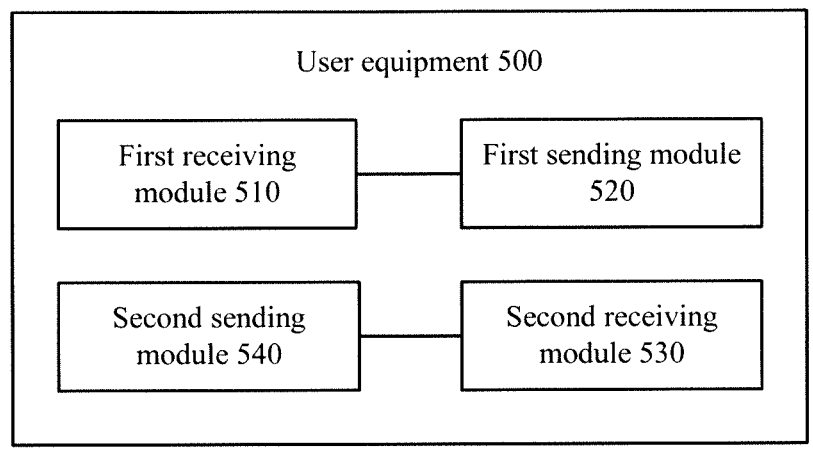
FIG. 6 is a schematic block diagram of user equipment according to an embodiment of the present application.

FIG. 6 is a schematic block diagram of user equipment 500 according to an embodiment of the present application. As shown in FIG. 6, the user equipment 500 includes:

a first receiving module 510, configured to receive a first reference signal set sent by a base station, where the first reference signal set includes at least two reference signals;

a first sending module 520, configured to send first channel state information CSI to the base station, where the first CSI is determined according to the first reference signal set, and the first CSI includes a first rank indicator RI and/or a first precoding matrix indicator PMI;

a second receiving module 530, configured to receive a second reference signal set sent by the base station, where the second reference signal set is determined based on the first CSI, and the second reference signal set includes at least one reference signal; and a second sending module 540, configured to send second CSI to the base station, where the second CSI is determined according to the second reference signal set received by the second receiving module 530.

Therefore, according to the user equipment in this embodiment of the present application, the user equipment acquires first CSI and second CSI according to a first reference signal set and a second reference signal set that are sent by a base station, where the second reference signal set is obtained according to a first rank indicator RI and/or a first precoding matrix indicator PMI in the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

In this embodiment of the present application, optionally, the second receiving module 530 is specifically configured to:

receive the second reference signal set sent by the base station, where the second reference signal set is determined based on the first RI included in the first CSI, or the second reference signal set is determined based on the first PMI included in the first CSI and a preset quantity of layers of a precoding matrix, or the second reference signal set is determined based on the first RI and the first PMI included in the first CSI.

In this embodiment of the present application, optionally, each reference signal included in the first reference signal set received by the first receiving module 510 corresponds to an antenna in an antenna subarray of the base station, and each reference signal included in the second reference signal set received by the second receiving module 530 corresponds to an antenna subarray of multiple antenna subarrays included in the base station.

In this embodiment of the present application, optionally, the first RI is 2 raised to the power of an integer.

In this embodiment of the present application, optionally, a sending period of the first reference signal set received by the first receiving module 510 is longer than a sending period of the second reference signal set received by the second receiving module 530.

Optionally, in this embodiment of the present application, the first CSI has a longer reporting period than the second CSI.

In this embodiment of the present application, optionally, the first sending module 520 is specifically configured to:

determine a first precoding matrix from a first codebook according to the first reference signal set; and send the first CSI to the base station, where the first CSI includes the first rank indicator RI and/or the first precoding matrix indicator PMI, and the first PMI is used to indicate the first precoding matrix, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

In this embodiment of the present application, optionally, the second sending module 540 is specifically configured to:
determine a second precoding matrix from a second codebook according to the second reference signal set; and
send the second CSI to the base station, where the second CSI includes a second rank indicator RI and/or a second precoding matrix indicator PMI, and the second PMI is used to indicate the second precoding matrix.

In this embodiment of the present application, optionally, a precoding matrix W included in the second codebook is a product of two matrixes $W_1$ and $W_2$, where the matrix $W_1$ is a block diagonal matrix. The block diagonal matrix includes at least one block matrix X, and each block matrix X is a Kronecker product of two matrixes C and D.

In this embodiment of the present application, optionally, the second codebook includes at least one precoding matrix W, and the precoding matrix W has a structure determined according to equation (67) or equation (68):

$$W = (2NM)^{-\frac{1}{2}} \begin{bmatrix} w \otimes v \\ e^{j\varphi} w \otimes v \end{bmatrix} \quad (67)$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix}, \quad (68)$$

where w and v are an N-dimensional column vector or an M-dimensional column vector, $\otimes$ denotes a Kronecker product, M and N are positive integers, and $\varphi$ is a phase.

Optionally, the column vectors w or v may be:

$$w = [1 e^{j\varphi} \ldots e^{j(N-1)\varphi}]^T \quad (69)$$

$$v = [1 e^{j\varphi} \ldots e^{j(M-1)\varphi}]^T, \quad (70)$$

where
$[\ ]^T$ denotes a matrix transpose, and $\theta$ and $\varphi$ are phases.
Optionally, the phase $\theta = m\pi/16$, and $m=0, \ldots 15$; or optionally, the phase $\theta = n\pi/32$, and $n=0, \ldots, 31$; or optionally, the phase $\varphi = l\pi/2$, and $l=0, \ldots 3$ or $l=0, 1$.

It should be understood that in this embodiment of the present application, the size of the first reference signal set may also be the same as the size of the second reference signal set. In addition, the first reference signal set and the second reference signal set occupy a same time-frequency resource in a resource block, or a time-frequency resource used by one of the two reference signal sets is a subset of a time-frequency resource used by the other reference signal set; however, the present application is not limited thereto. For example, the first reference signal set and the second reference signal set may use a cell-specific reference signal CRS or a channel state information reference signal CSI-RS in an LTE system, and the first CSI and the second CSI may be based on a codebook based on the LTE R8 or R10 or R12. In this way, backward compatibility of the system can be kept.

It should be understood that in each embodiment of the present application, the precoding matrix structure in the codebook related to the foregoing equipment is not limited to being used for two or more CSI measurement processes in the method. For example, the precoding matrix structure mentioned in (67) to (70) may be used for the third CSI measurement and reporting process described above, or used for a CSI measurement process based on a single reference signal set. For example, the CSI measurement process is similar to a CSI measurement process based on a CRS in the LTE R8 system or based on a CSI-RS in the LTE R8 system, which is not further described in detail herein.

The user equipment 500 according to this embodiment of the present application may correspond to the user equipment in the method for reporting channel state information according to the embodiment of the present application, and the foregoing and other operations and/or functions of each module in the user equipment 500 are intended for implementing a corresponding process of each method in FIG. 1 to FIG. 5, which are not described in detail herein for brevity.

Therefore, according to the user equipment in this embodiment of the present application, the user equipment acquires first CSI and second CSI according to a first reference signal set and a second reference signal set that are sent by a base station, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

Figure 7:
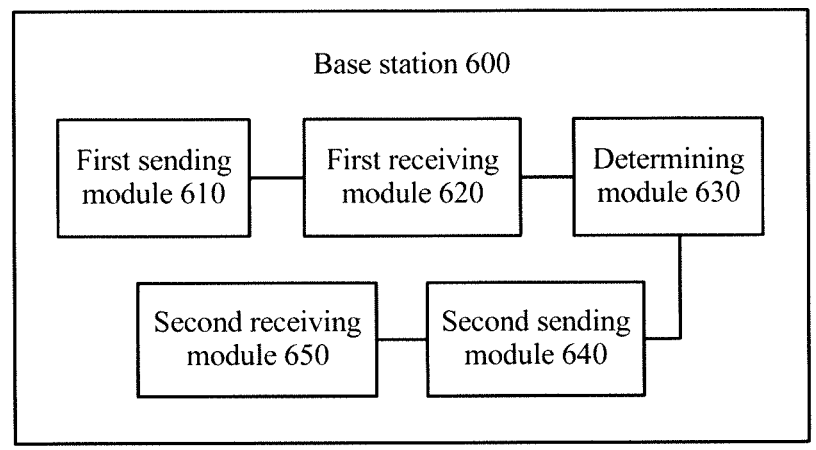
FIG. 7 is a schematic block diagram of a base station according to an embodiment of the present application.

FIG. 7 is a schematic block diagram of a base station 600 according to an embodiment of the present application. As shown in FIG. 7, the base station 600 includes:
a first sending module 610, configured to send a first reference signal set to user equipment, where the first reference signal set includes at least two reference signals;
a first receiving module 620, configured to receive first channel state information CSI sent by the user equipment, where the first CSI is determined based on the first reference signal set, and the first CSI includes a first rank indicator RI and/or a first precoding matrix indicator PMI;
a determining module 630, configured to determine a second reference signal set according to the first CSI received by the first receiving module 620, where the second reference signal set includes at least one reference signal;
a second sending module 640, configured to send the second reference signal set determined by the determining module 630 to the user equipment; and
a second receiving module 650, configured to receive second CSI sent by the user equipment, where the second CSI is determined based on the second reference signal set.

Therefore, according to the base station in this embodiment of the present application, the base station sends a first reference signal set and a second reference signal set to user equipment, so that the user equipment acquires first CSI and second CSI, where the second reference signal set is obtained according to a first rank indicator RI and/or a first precoding matrix indicator PMI in the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

In this embodiment of the present application, optionally, the determining module 630 is specifically configured to:

determine the second reference signal set according to the first RI when the first CSI includes the first RI; or determine the second reference signal set according to the first PMI and a preset quantity of layers of a precoding matrix when the first CSI includes the first PMI; or determine the second reference signal set according to the first RI and the first PMI when the first CSI includes the first RI and the first PMI.

In this embodiment of the present application, optionally, each reference signal included in the first reference signal set sent by the first sending module 610 corresponds to an antenna in an antenna subarray of the base station, and each reference signal included in the second reference signal set sent by the second sending module 640 corresponds to an antenna subarray of multiple antenna subarrays included in the base station.

In this embodiment of the present application, optionally, the first RI or the preset quantity of layers of the precoding matrix is 2 raised to the power of an integer.

In this embodiment of the present application, optionally, a sending period of the first reference signal set is longer than a sending period of the second reference signal set.

Optionally, in this embodiment of the present application, the first CSI has a longer reporting period than the second CSI.

In this embodiment of the present application, optionally, the first PMI is used to indicate a first precoding matrix determined by the user equipment from a first codebook according to the first reference signal set sent by the first sending module 610, where a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

In this embodiment of the present application, optionally, the second receiving module 650 is specifically configured to:

receive the second CSI sent by the user equipment, where the second CSI includes a second rank indicator RI and/or a second precoding matrix indicator PMI, and the second PMI is used to indicate a second precoding matrix determined by the user equipment from a second codebook according to the second reference signal set.

In this embodiment of the present application, optionally, a precoding matrix W included in the second codebook is a product of two matrixes $W_1$ and $W_2$, where the matrix $W_1$ is a block diagonal matrix. The block diagonal matrix includes at least one block matrix X, and each block matrix X is a Kronecker product of two matrixes C and D.

In this embodiment of the present application, optionally, the second codebook includes at least one precoding matrix W, and the precoding matrix W has a structure determined according to equation (67) or (68):

$$W = (2NM)^{-\frac{1}{2}} \begin{bmatrix} w \otimes v \\ e^{j\varphi} w \otimes v \end{bmatrix} \quad (67)$$

$$W = (4NM)^{-\frac{1}{2}} \begin{bmatrix} w \otimes v & w \otimes v \\ e^{j\varphi} w \otimes v & -e^{j\varphi} w \otimes v \end{bmatrix} \quad (68)$$

w and v are an N-dimensional column vector or an M-dimensional column vector, $\otimes$ denotes a Kronecker product, M and N are positive integers, and is a phase.

Optionally, the column vectors w or v may be:

$$w = [1 e^{j\varphi} \ldots e^{j(N-1)\varphi}]^T \quad (69)$$

$$v = [1 e^{j\theta} \ldots e^{j(M-1)\theta}]^T \quad (70),$$

where $[\ ]^T$ denotes a matrix transpose, and $\theta$ and $\varphi$ are phases.

Optionally, the phase $\theta = m\pi/16$ and $m=0, \ldots, 15$; or optionally, the phase $\varphi = n\pi/32$, and $n=0, \ldots, 31$; or optionally, the phase $\varphi = l\pi/2$, and $l=0, \ldots, 3$ or $l=0, 1$.

The base station 600 according to this embodiment of the present application may correspond to the base station in the method for reporting channel state information according to the embodiment of the present application, and the foregoing and other operations and/or functions of each module in the base station 600 are intended for implementing a corresponding process of each method in FIG. 1 to FIG. 5, which are not described in detail herein for brevity.

Therefore, according to the base station in this embodiment of the present application, the base station sends a first reference signal set and a second reference signal set to user equipment, so that the user equipment acquires first CSI and second CSI, where the second reference signal set is obtained according to a first rank indicator RI and/or a first precoding matrix indicator PMI in the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

In addition, the terms "system" and "network" herein are usually exchangeable. In this specification, a term "and/or"

is only an associative relationship for describing associated objects, indicating that three relationships may exist, for example, A and/or B, which may indicate three situations: A exists independently; A and B exist simultaneously; and B exists independently. In addition, in this specification, a character "/" generally indicates an "or" relationship between a former and a later associated objects.

It should be understood that in the embodiments of the present application, "B corresponding to A" indicates that B is associated with A, and B may be determined according to A. However, it should further be understood that determining B according to A does not mean that B is determined only according to A, and B may also be determined according to A and/or other information.

Figure 8:
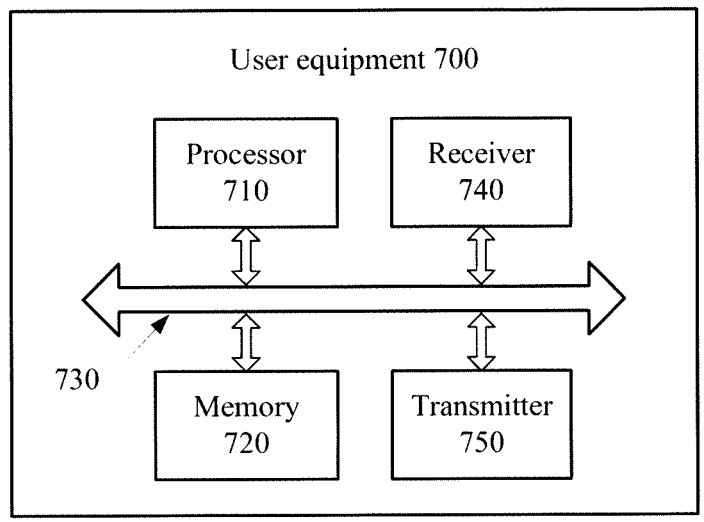
FIG. 8 is another schematic block diagram of user equipment according to an embodiment of the present application.

As shown in FIG. 8, this embodiment of the present application further provides user equipment 700. The user equipment 700 includes a processor 710, a memory 720, a bus system 730, a receiver 740, and a transmitter 750. The processor 710, the memory 720, the receiver 740, and the transmitter 750 are connected by using the bus system 730. The memory 720 is configured to store an instruction. The processor 710 is configured to execute the instruction stored in the memory 720, so as to control the receiver 740 to receive a signal and control the transmitter 750 to send a signal. The receiver 740 is configured to receive a first reference signal set sent by a base station; the processor 710 is configured to determine a first precoding matrix from a first codebook according to the first reference signal set; the transmitter 750 is configured to send first channel state information CSI to the base station, where the first CSI includes a first rank indicator RI and/or a first precoding matrix indicator PMI, and the first PMI is used to indicate the first precoding matrix; the receiver 740 is further configured to receive a second reference signal set sent by the base station, where the second reference signal set is determined based on the first CSI; and the transmitter 750 is further configured to send second CSI to the base station, where the second CSI is determined according to the second reference signal set.

Therefore, according to the user equipment in this embodiment of the present application, the user equipment acquires first CSI and second CSI according to a first reference signal set and a second reference signal set that are sent by a base station, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

It should be understood that, in this embodiment of the present application, the processor 710 may be a central processing unit (CPU), and the processor 710 may also be another general purpose processor, a digital signal processor (DSP), an application-specific integrated circuit (ASIC), a field programmable gate array (FPGA) or other programmable logical device, a discrete gate or transistor logical device, a discrete hardware assembly, or the like. The general purpose processor may be a microprocessor, or the processor may also be any conventional processor, or the like.

The memory 720 may include a read-only memory and a random access memory, and provide instructions and data for the processor 710. A part of the memory 720 may further include a non-volatile random access memory. For example, the memory 720 may further store device type information.

The bus system 730 may further include a power supply bus, a control bus, a status signal bus, and the like in addition to a data bus. However, for clear description, various buses are denoted as the bus system 730 in the diagram.

In an implementation process, the steps of the method may be implemented by an integrated logical circuit of hardware in the processor 710, or by a software instruction. The steps of the methods disclosed with reference to the embodiments of the present application may be directly executed and completed by a hardware processor, or may be executed and completed by a combination of hardware and a software module in a processor. The software module may be located in a mature storage medium in the art, such as a random access memory, a flash memory, a read-only memory, a programmable read-only memory, or an electrically erasable programmable memory, or a register. The storage medium is located in the memory 720, and the processor 710 reads information in the memory 720 and implements, in combination with its hardware, the steps of the foregoing methods. To avoid repetition, details are not described herein.

Optionally, in an embodiment, the receiving, by the receiver 740, a second reference signal set sent by the base station, where the second reference signal set is determined based on the first CSI, includes:

receiving the second reference signal set sent by the base station, where the second reference signal set is determined based on the first RI included in the first CSI, or the second reference signal set is determined based on the first PMI included in the first CSI and a preset quantity of layers of a precoding matrix.

Optionally, in an embodiment, each reference signal included in the first reference signal set corresponds to an antenna in an antenna subarray of the base station, and each reference signal included in the second reference signal set corresponds to an antenna subarray of multiple antenna subarrays included in the base station.

Optionally, in an embodiment, the first RI is 2 raised to the power of an integer.

Optionally, in an embodiment, a sending period of the first reference signal set is longer than a sending period of the second reference signal set.

Optionally, in this embodiment of the present application, the first CSI has a longer reporting period than the second CSI.

Optionally, in an embodiment, a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

Optionally, in an embodiment, the sending, by the transmitter 750, second CSI to the base station, where the second CSI is determined according to the second reference signal set, includes:

determining a second precoding matrix from a second codebook according to the second reference signal set; and sending the second CSI to the base station, where the second CSI includes a second rank indicator RI and/or a second precoding matrix indicator PMI, and the second PMI is used to indicate the second precoding matrix.

Optionally, in an embodiment, a precoding matrix W included in the second codebook is a product of two matrixes $W_1$ and $W_2$, where the matrix $W_1$ is a block diagonal matrix. The block diagonal matrix includes at least one block matrix X, and each block matrix X is a Kronecker product of two matrixes C and D.

Optionally, in an embodiment, the second codebook includes at least one precoding matrix W, and the precoding matrix W has a structure determined according to equation (67) or (68):

$$W = (2NM)^{-\frac{1}{2}} \begin{bmatrix} w \otimes v \\ e^{j\varphi} w \otimes v \end{bmatrix} \quad (67)$$

$$W = (4NM)^{-\frac{1}{2}} \begin{bmatrix} w \otimes v & w \otimes v \\ e^{j\varphi} w \otimes v & -e^{j\varphi} w \otimes v \end{bmatrix}, \quad (68)$$

where w and v are an N-dimensional column vector or an M-dimensional column vector, $\otimes$ denotes a Kronecker product, M and N are positive integers, and $\varphi$ is a phase.

Optionally, the column vectors w or v may be:

$$w=[1 e^{j\varphi} \ldots e^{j(N-1)\varphi}]^T \quad (69)$$

$$v=[1 e^{j\theta} \ldots e^{j(M-1)\theta}]^T \quad (70),$$

wherein $[\ ]^T$ denotes a matrix transpose, and $\theta$ and $\varphi$ are phases.

Optionally, the phase $\theta=m\pi/16$, and m=0, . . . , 15; or optionally, the phase $\varphi=n\pi/32$, and n=0, . . . , 31; or optionally, the phase $\varphi=l\pi/2$, and l=0, . . . , 3 or l=0, 1.

It should be understood that in this embodiment of the present application, the size of the first reference signal set may also be the same as the size of the second reference signal set. In addition, the first reference signal set and the second reference signal set occupy a same time-frequency resource in a resource block, or a time-frequency resource used by one of the two reference signal sets is a subset of a time-frequency resource used by the other reference signal set; however, the present application is not limited thereto.

It should be understood that the user equipment 700 according to this embodiment of the present application may correspond to the user equipment in the method for reporting channel state information according to the embodiment of the present application, and may also correspond to the user equipment 500 according to the embodiment of the present application, and the foregoing and other operations and/or functions of each module in the user equipment 700 are intended for implementing a corresponding process of each method in FIG. 1 to FIG. 5, which are not described in detail herein for brevity.

Therefore, according to the user equipment in this embodiment of the present application, the user equipment acquires first CSI and second CSI according to a first reference signal set and a second reference signal set that are sent by a base station, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

Figure 9:
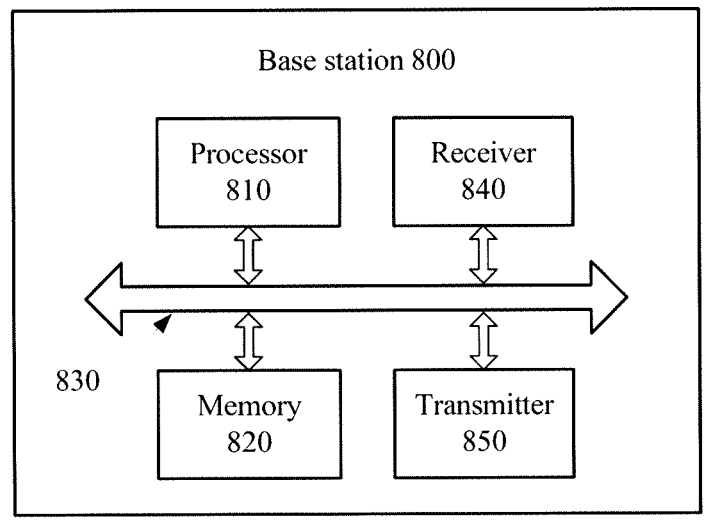
FIG. 9 is another schematic block diagram of a base station according to an embodiment of the present application.

As shown in FIG. 9, an embodiment of the present application further provides a base station 800. The base station 800 includes a processor 810, a memory 820, a bus system 830, a receiver 840, and a transmitter 850. The processor 810, the memory 820, the receiver 840, and the transmitter 850 are connected by using the bus system 830; the memory 820 is configured to store an instruction; and the processor 810 is configured to execute the instruction stored in the memory 820, so as to control the receiver 840 to receive a signal and control the transmitter 850 to send a signal. The transmitter 850 is configured to send a first reference signal set to user equipment. The receiver 840 is configured to receive first channel state information CSI sent by the user equipment, where the first CSI includes a first rank indicator RI and/or a first precoding matrix indicator PMI, and the first PMI is used to indicate a first precoding matrix determined by the user equipment from a first codebook according to the first reference signal set. The processor 810 is configured to determine a second reference signal set according to the first CSI; the transmitter 850 is further configured to send the second reference signal set to the user equipment; and the receiver 840 is further configured to receive second CSI sent by the user equipment, where the second CSI is determined based on the second reference signal set.

Therefore, according to the base station in this embodiment of the present application, the base station sends a first reference signal set and a second reference signal set to user equipment, so that the user equipment acquires first CSI and second CSI, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

It should be understood that, in this embodiment of the present application, the processor 810 may be a central processing unit (CPU), and the processor 810 may also be another general purpose processor, a digital signal processor (DSP), an application-specific integrated circuit (ASIC), a field programmable gate array (FPGA) or other programmable logical device, a discrete gate or transistor logical device, a discrete hardware assembly, or the like. The general purpose processor may be a microprocessor, or the processor may also be any conventional processor, or the like.

The memory 820 may include a read-only memory and a random access memory, and provide instructions and data for the processor 810. A part of the memory 820 may further include a non-volatile random access memory. For example, the memory 820 may further store device type information.

The bus system 830 may further include a power supply bus, a control bus, a status signal bus, and the like in addition to a data bus. However, for clear description, various buses are denoted as the bus system 830 in the diagram.

In an implementation process, the steps of the method may be implemented by an integrated logical circuit of hardware in the processor 810, or by a software instruction. The steps of the methods disclosed with reference to the embodiments of the present application may be directly executed and completed by a hardware processor, or may be executed and completed by a combination of hardware and a software module in a processor. The software module may be located in a mature storage medium in the art, such as a random access memory, a flash memory, a read-only memory, a programmable read-only memory, or an electrically erasable programmable memory, or a register. The storage medium is located in the memory 820, and the processor 810 reads information in the memory 820 and implements, in combination with its hardware, the steps of the foregoing methods. To avoid repetition, details are not described herein.

Optionally, in an embodiment, the determining, by the processor 810, a second reference signal set according to the first CSI includes:

determining the second reference signal set according to the first RI when the first CSI includes the first RI; or determining the second reference signal set according to the first PMI and a preset quantity of layers of a precoding matrix when the first CSI includes the first PMI.<0}

Optionally, in an embodiment, each reference signal included in the first reference signal set corresponds to an antenna in an antenna subarray of the base station, and each reference signal included in the second reference signal set corresponds to an antenna subarray of multiple antenna subarrays included in the base station.

Optionally, in an embodiment, the first RI is 2 raised to the power of an integer.

Optionally, in an embodiment, a sending period of the first reference signal set is longer than a sending period of the second reference signal set.

Optionally, in this embodiment of the present application, the first CSI has a longer reporting period than the second CSI.

Optionally, in an embodiment, a precoding matrix included in the first codebook is a discrete Fourier transform DFT matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

Optionally, in an embodiment, the receiving, by the receiver 840, the second CSI sent by the user equipment includes:

receiving the second CSI sent by the user equipment, where the second CSI includes a second rank indicator RI and/or a second precoding matrix indicator PMI, and the second PMI is used to indicate a second precoding matrix determined by the user equipment from a second codebook according to the second reference signal set.

Optionally, in an embodiment, a precoding matrix W included in the second codebook is a product of two matrixes $W_1$ and $W_2$, where the matrix $W_1$ is a block diagonal matrix. The block diagonal matrix includes at least one block matrix X, and each block matrix X is a Kronecker product of two matrixes C and D.

Optionally, in an embodiment, the second codebook includes at least one precoding matrix W, and the precoding matrix W has a structure determined according to equation (67) or (68):

$$W = (2NM)^{-\frac{1}{2}} \begin{bmatrix} w \otimes v \\ e^{j\varphi} w \otimes v \end{bmatrix} \quad (67)$$

$$W = (4NM)^{-\frac{1}{2}} \begin{bmatrix} w \otimes v & w \otimes v \\ e^{j\varphi} w \otimes v & -e^{j\varphi} w \otimes v \end{bmatrix} \quad (68)$$

where w and v are an N-dimensional column vector or an M-dimensional column vector, $\otimes$ denotes a Kronecker product, M and N are positive integers, and $\varphi$ is a phase.

Optionally, the column vectors w or v may be:

$$w = [1\ e^{j\varphi} \ldots e^{j(N-1)\varphi}]^T \quad (69)$$

$$v = [1\ e^{j\theta} \ldots e^{j(M-1)\theta}]^T \quad (70),$$

where $[\ ]^T$ denotes a matrix transpose, and $\theta$ and $\varphi$ are phases.

Optionally, the phase $\theta = m\pi/16$, and $m=0, \ldots, 15$; or optionally, the phase $\varphi = n\pi/32$, and $n=0, \ldots, 31$; or optionally, the phase $\varphi = l\pi/2$, and $l=0, \ldots, 3$ or $l=0, 1$.

It should be understood that the base station 800 according to this embodiment of the present application may correspond to the base station in the method for reporting channel state information according to the embodiment of the present application, and may also correspond to the base station 600 according to the embodiment of the present application, and the foregoing and other operations and/or functions of each module in the base station 800 are intended for implementing a corresponding process of each method in FIG. 1 to FIG. 5, which are not described in detail herein for brevity.

Therefore, according to the base station in this embodiment of the present application, the base station sends a first reference signal set and a second reference signal set to user equipment, so that the user equipment acquires first CSI and second CSI, where the second reference signal set is obtained according to the first CSI. Therefore, spatial correlation of an antenna port corresponding to the first reference signal set can be fully utilized, reference signal overheads of the first reference signal set and the second reference signal set are far smaller than antenna overheads of transmitting reference signals or data, and system efficiency can be improved effectively. In addition, in the foregoing solution, channel state information measurement is implemented by measuring the first CSI and the second CSI. The first CSI is obtained based on the first reference signal set, and the second CSI is obtained based on the second reference signal set. However, a quantity of antenna ports corresponding to the first reference signal set and the second reference signal set is far smaller than a quantity of antennas that actually transmit the reference signals or data. Therefore, CSI feedback precision is enhanced, channel state information measurement complexity of the user equipment is effectively reduced, and system performance is effectively improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for reporting channel state information (CSI), comprising:
    receiving a first reference signal set from a base station, wherein the first reference signal set comprises at least two reference signals;
    sending first CSI to the base station, wherein the first CSI is determined according to the first reference signal set, and the first CSI comprises at least one of a first rank indicator (RI) and a first precoding matrix indicator (PMI);
    receiving a second reference signal set from the base station, wherein antenna port information of the second reference signal set is determined based on the first CSI, and the second reference signal set comprises at least one reference signal, wherein the antenna port information of the second reference signal set comprises at least one of following information: quantity of antenna ports corresponding to the second reference signal set, antenna port number of each of the antenna ports, or reference signal sequence initialization ID corresponding to each of the antenna ports; and
    sending second CSI to the base station, wherein the second CSI is determined according to the second reference signal set,
    wherein each reference signal comprised in the first reference signal set corresponds to an antenna in an antenna subarray of the base station, and each reference signal comprised in the second reference signal set corresponds to an antenna subarray of multiple antenna subarrays comprised in the base station.

2. The method according to claim 1, wherein the receiving a second reference signal, comprises:
    receiving the second reference signal set from the base station, wherein the second reference signal set is determined based on the first PMI comprised in the first CSI and a preset quantity of layers of a precoding matrix.

3. The method according to claim 1, wherein the first RI is 2 raised to the power of an integer.

4. The method according to claim 1, wherein a sending period of the first reference signal set is longer than a sending period of the second reference signal set.

5. The method according to claim 1, wherein the sending first CSI, comprises:
    determining a first precoding matrix from a first codebook according to the first reference signal set; and sending the first CSI to the base station, wherein the first CSI comprises at least one of the first RI and the first PMI, and the first PMI is used to indicate the first precoding matrix, wherein a precoding matrix comprised in the first codebook is a discrete Fourier transform (DFT) matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

6. The method according to claim 1, wherein the sending second CSI, comprises:

determining a second precoding matrix from a second codebook according to the second reference signal set; and sending the second CSI to the base station, wherein the second CSI comprises at least one of a second RI and a second PMI, and the second PMI is used to indicate the second precoding matrix, wherein the second codebook comprises at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix}$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

wherein $w=[1\ e^{j\phi}\ \ldots\ e^{j(N-1)\phi}]^T$, $v=[1\ e^{j\theta}\ \ldots\ e^{j(M-1)\theta}]^T$, $[\ ]^T$ denotes a matrix transpose, $\otimes$ denotes a Kronecker product, M and N are positive integers, and $\theta$, $\phi$, and $\varphi$ are phases.

7. The method according to claim 6, wherein the phase $\theta=m\pi/16$, and $m=0, \ldots, 15$; or the phase $\phi=n\pi/32$ and $n=0, \ldots, 31$; or the phase $\varphi=l\pi/2$, and $l=0, \ldots, 3$ or $l=0, 1$.

8. User equipment, comprising:

a receiver, configured to receive a first reference signal set from a base station, wherein the first reference signal set comprises at least two reference signals;

a transmitter, configured to send first channel state information (CSI) to the base station, wherein the first CSI is determined according to the first reference signal set, and the first CSI comprises at least one of a first rank indicator (RI) and a first precoding matrix indicator (PMI);

the receiver is further configured to receive a second reference signal set from the base station, wherein antenna port information of the second reference signal set is determined based on the first CSI, and the second reference signal set comprises at least one reference signal, wherein the antenna port information of the second reference signal set comprises at least one of following information: quantity of antenna ports corresponding to the second reference signal set, antenna port number of each of the antenna ports, or reference signal sequence initialization ID corresponding to each of the antenna ports; and the transmitter is further configured to send second CSI to the base station, wherein the second CSI is determined according to the second reference signal set, wherein each reference signal comprised in the first reference signal set corresponds to an antenna in an antenna subarray of the base station, and each reference signal comprised in the second reference signal set corresponds to an antenna subarray of multiple antenna subarrays comprised in the base station.

9. The user equipment according to claim 8, wherein the receiver is configured to:

receive the second reference signal set from the base station, wherein the second reference signal set is determined based on the first PMI comprised in the first CSI and a preset quantity of layers of a precoding matrix.

10. The user equipment according to claim 9, wherein the first RI is 2 raised to the power of an integer.

11. The user equipment according to claim 9, wherein a sending period of the first reference signal set is longer than a sending period of the second reference signal set.

12. The user equipment according to claim 9, wherein the transmitter is configured to:

determine a first precoding matrix from a first codebook according to the first reference signal set; and send the first CSI to the base station, wherein the first CSI comprises at least one of the first RI and the first PMI, and the first PMI is used to indicate the first precoding matrix, wherein a precoding matrix comprised in the first codebook is a discrete Fourier transform (DFT) matrix, a Hadamard matrix, a Householder matrix, a Kronecker product of two DFT matrixes, a Kronecker product of a DFT matrix and a Hadamard matrix, or a Kronecker product of a DFT matrix and a Householder matrix.

13. The user equipment according to claim 9, wherein the transmitter is configured to:

determine a second precoding matrix from a second codebook according to the second reference signal set; and send the second CSI to the base station, wherein the second CSI comprises at least one of the second RI and the second PMI, and the second PMI is used to indicate the second precoding matrix, wherein the second codebook comprises at least one precoding matrix W, and the precoding matrix W has a structure determined according to the following equation:

$$W = (2NM)^{-\frac{1}{2}} \begin{bmatrix} w \otimes v \\ e^{j\varphi} w \otimes v \end{bmatrix}$$

or $$W = (4NM)^{-\frac{1}{2}} \begin{bmatrix} w \otimes v & w \otimes v \\ e^{j\varphi} w \otimes v & -e^{j\varphi} w \otimes v \end{bmatrix},$$

wherein $w=[1\ e^{j\phi}\ \ldots\ e^{j(N-1)\phi}]^T$, $v=[1\ e^{j\theta}\ \ldots\ e^{j(M-1)\theta}]^T$, $[\ ]^T$ denotes a matrix transpose, $\otimes$ denotes a Kronecker product, M and N are positive integers, and $\theta$, $\phi$, and $\varphi$ are phases.

14. The user equipment according to claim 13, wherein the phase $\theta=m\pi/16$ and $m=0, \ldots, 15$; or the phase $\phi=n\pi/32$, and $n=0, \ldots, 31$; or the phase $\phi=l\pi/2$, and $l=0, \ldots, 3$ or $l=0, 1$.

15. A base station, comprising:

a transmitter, configured to send a first reference signal set to user equipment, wherein the first reference signal set comprises at least two reference signals;

a receiver, configured to receive first channel state information (CSI) from the user equipment, wherein the first CSI is determined based on the first reference signal set, and the first CSI comprises at least one of a first rank indicator (RI) and a first precoding matrix indicator (PMI);

a processor, configured to determine antenna port information of a second reference signal set according to the first CSI, wherein the second reference signal set comprises at least one reference signal, and the antenna port information of the second reference signal set comprises at least one of following information: quantity of antenna ports corresponding to the second reference signal set, antenna port number of each of the antenna ports, or reference signal sequence initialization ID corresponding to each of the antenna ports;

the transmitter is further configured to send the second reference signal set to the user equipment according to the antenna port information of the second reference signal; and the receiver is further configured to receive second CSI from the user equipment, wherein the second CSI is determined based on the second reference signal set, wherein each reference signal comprised in the first reference signal set corresponds to an antenna in an antenna subarray of the base station, and each reference signal comprised in the second reference signal set corresponds to an antenna subarray of multiple antenna subarrays comprised in the base station.

16. The base station according to claim 15, wherein the processor is configured to:

determine the second reference signal set according to the first PMI and a preset quantity of layers of a precoding matrix when the first CSI comprises the first PMI.

17. The base station according to claim 15, wherein a sending period of the first reference signal set is longer than a sending period of the second reference signal set.

* * * * *